(12) United States Patent
Miyamoto et al.

(10) Patent No.: US 7,294,435 B2
(45) Date of Patent: Nov. 13, 2007

(54) POSITIVE ELECTRODE ACTIVE MATERIAL FOR NONAQUEOUS ELECTROLYTE SECONDARY BATTERY, POSITIVE ELECTRODE MIXTURE FOR NONAQUEOUS ELECTROLYTE SECONDARY BATTERY, AND NONAQUEOUS ELECTROLYTE SECONDARY BATTERY

(75) Inventors: Yoshifumi Miyamoto, Tokushima (JP); Kenichi Kobayashi, Tokushima (JP)

(73) Assignee: Nichia Corporation, Anan (JP)

( * ) Notice: Subject to any disclaimer, the term of this patent is extended or adjusted under 35 U.S.C. 154(b) by 554 days.

(21) Appl. No.: 10/846,694

(22) Filed: May 17, 2004

(65) Prior Publication Data

US 2004/0229124 A1    Nov. 18, 2004

(30) Foreign Application Priority Data

May 15, 2003 (JP) ............................. 2003-136834
Aug. 21, 2003 (JP) ............................. 2003-297069
Sep. 25, 2003 (JP) ............................. 2003-333063

(51) Int. Cl.
*H01M 4/58* (2006.01)

(52) U.S. Cl. .............................. 429/231.1; 429/231.5; 429/231.6; 429/231.7; 429/231.95

(58) Field of Classification Search ............. 429/231.1, 429/231.95, 224, 231.5, 231.6, 231.7
See application file for complete search history.

(56) References Cited

U.S. PATENT DOCUMENTS 6,368,750 B1    4/2002  Nemoto et al. ........ 429/231.95
6,489,060 B1   12/2002  Zhang et al. ................ 429/224

FOREIGN PATENT DOCUMENTS

| JP | A 09-035715 | 2/1997 |
| JP | A 09-092257 | 4/1997 |
| JP | A 2000-90933 | 3/2000 |
| JP | A 2000-128539 | 5/2000 |
| JP | A 2001-6678 | 1/2001 |
| JP | A 2001-185146 | 7/2001 |

*Primary Examiner*—Patrick Joseph Ryan
*Assistant Examiner*—Thomas H. Parsons
(74) *Attorney, Agent, or Firm*—Oliff & Berridge, PLC

(57) ABSTRACT

Disclosed is a positive electrode active material for a nonaqueous electrolyte secondary battery containing at least a lithium-transition metal composite oxide of a spinel structure, in which at least one kind of element which may become tetravalent exists on at least a surface of the lithium-transition metal composite oxide, and concentration of the element which may become tetravalent on the surface of the lithium-transition metal composite oxide is higher than concentration of the element which may become tetravalent inside the lithium-transition metal composite oxide. A use of this positive electrode active material can improve cycle characteristics and high rate characteristics without reducing the charge-discharge capacity of the lithium-transition metal composite oxide.

11 Claims, 7 Drawing Sheets

POSITIVE ELECTRODE ACTIVE MATERIAL FOR NONAQUEOUS ELECTROLYTE SECONDARY BATTERY, POSITIVE ELECTRODE MIXTURE FOR NONAQUEOUS ELECTROLYTE SECONDARY BATTERY, AND NONAQUEOUS ELECTROLYTE SECONDARY BATTERY

This Nonprovisional application claims priority under 35 U.S.C. § 119(a) on Patent Applications No.2003-136834 filed in JAPAN on May 15, 2003, No.2003-297069 filed in JAPAN on Aug. 21, 2003, and No.2003-333063 filed in JAPAN on Sep. 25, 2003, the entire contents of which are hereby incorporated by reference.

BACKGROUND OF THE INVENTION

1. Field of the Invention

The present invention relates to a positive electrode active material for a nonaqueous electrolyte secondary battery such as a lithium ion secondary battery (hereinafter, may also be simply referred to as "positive electrode active material"), a positive electrode mixture for a nonaqueous electrolyte secondary battery (hereinafter, may also be simply referred to as "positive electrode mixture"), and a nonaqueous electrolyte secondary battery. The present invention more specifically relates to a positive electrode active material, a positive electrode mixture, and a nonaqueous electrolyte secondary battery, having significantly improved battery characteristics and employing a lithium-transition metal composite oxide of a spinel structure.

2. Description of the Related Art

A nonaqueous electrolyte secondary battery has a feature that an operating voltage and an energy density are high as compared with a conventional nickel-cadmium secondary battery and the like, and has been widely used as a power source for electronic appliances. A positive electrode active material of the nonaqueous electrolyte secondary battery includes lithium-transition metal composite oxides represented by $LiCoO_2$, $LiNiO_2$, and $LiMn_2O_4$ and the like.

Of those, $LiMn_2O_4$ contains manganese existing in large amount as a resource, thereby employing lowly priced and easily available raw materials for $LiMn_2O_4$. There is another feature that environmental load is low. Further, a crystal structure of $LiMn_2O_4$ is stable even if all Li ions desorb from the crystal structure through a deintercalation reaction. Thus, a nonaqueous electrolyte secondary battery employing $LiMn_2O_4$ generates less heat in an over discharge state compared to those employing $LiCoO_2$ and $LiNiO_2$.

The nonaqueous electrolyte secondary battery employing $LiMn_2O_4$ having the advantages described above has been conventionally used for mobile electronic appliances such as cellular phones, laptop personal computers, and digital cameras, providing sufficient battery characteristics for such applications.

However, there is an increasing demand for improved characteristics of the mobile electronic appliances resulting from high-functionalization such as provisions of various functions, uses in high temperatures or low temperatures, or the like. Further, application of the nonaqueous electrolyte secondary battery to power sources such as batteries for electric vehicles is expected.

Therefore, sufficient battery characteristics cannot be obtained with a conventional nonaqueous electrolyte secondary battery, and further improvements are required.

JP 2001-6678 A (the term "JP XX-XXXXXX A" as used herein means an "unexamined published Japanese patent application") describes a use of a lithium manganese oxide, as a positive electrode, prepared by modifying particles of a lithium manganese spinel compound by a compound of a different metal excluding lithium and manganese. JP 2001-6678 A describes that this lithium manganese oxide significantly improves a capacity damping rate at high temperatures.

However, sufficient cycle characteristics and high rate characteristics could not be obtained at normal temperatures using this lithium manganese oxide.

Further, JP 2000-90933 A describes a use of $LiM_ZMe_{X-Z}O_Y$ (where, M represents a substitution element, M≠Me, and Z represents an amount of substitution), as a positive electrode active material, prepared by substituting a part of a transition element Me in a lithium-transition element composite oxide, $LiMe_XO_Y$, with two or more kinds of elements selected from the group consisting of Li, Fe, Mn, Ni, Mg, Zn, B, Al, Co, Cr, Si, Ti, Sn, P, V, Sb, Nb, Ta, Mo, and W. JP 2000-90933 A describes that this positive electrode active material improves electron conductivity of the positive electrode active material itself and reduces internal resistance of the battery while improving reversibility of a crystal structure of $LiMn_2O_4$ through intercalation/deintercalation of $Li^+$, to thereby improve cycle characteristics as a battery. Further, JP 2000-90933 A describes that inclusion of at least Ti as a substitution element M is preferable for providing a notable effect of improving the electron conductivity and that Ti is preferably used for effectively preventing decrease of a positive electrode capacity.

However, sufficient battery characteristics could not be obtained using this positive electrode active material under an even harsher environment for use and specifically under high temperatures. Further, a sufficient charge-discharge capacity and sufficient high rate characteristics also could not be obtained.

SUMMARY OF THE INVENTION

The present invention has been made in view of the above, and an object of the present invention is therefore to provide a positive electrode active material for a nonaqueous electrolyte secondary battery, a positive electrode mixture for a nonaqueous electrolyte secondary battery, and a nonaqueous electrolyte secondary battery, having excellent battery characteristics under an even harsher environment for use. The present invention more specifically provides: a positive electrode active material for a nonaqueous electrolyte secondary battery; a positive electrode mixture for a nonaqueous electrolyte secondary battery; and a nonaqueous electrolyte secondary battery, having at least one of excellent cycle characteristics, high rate characteristics, high-temperature characteristics, and charge-discharge capacity.

The first aspect of the present invention provides a positive electrode active material for a nonaqueous electrolyte secondary battery containing at least a lithium-transition metal composite oxide of a spinel structure, in which at least one kind of element which may become tetravalent exists on at least a surface of the lithium-transition metal composite oxide, and concentration of the element which may become tetravalent on the surface of the lithium-transition metal composite oxide is higher than concentration of the element which may become tetravalent inside the lithium-transition metal composite oxide.

According to the first aspect of the present invention, it is preferable that magnesium exists on at least the surface of the lithium-transition metal composite oxide, and concentration of the magnesium on the surface of the lithium-transition metal composite oxide is higher than concentration of the magnesium inside the lithium-transition metal composite oxide.

Further, according to the first aspect of the present invention, it is preferable that the concentration of the magnesium inside the lithium-transition metal composite oxide is higher than the concentration of the element which may become tetravalent inside the lithium-transition metal composite oxide.

Further, according to the first aspect of the present invention, it is preferable that boron exists on at least the surface of the lithium-transition metal composite oxide, and concentration of the boron on the surface of the lithium-transition metal composite oxide is higher than concentration of the boron inside the lithium-transition metal composite oxide.

Further, according to the first aspect of the present invention, it is preferable that the element which may become tetravalent is at least one of zirconium and cerium.

The second aspect of the present invention provides a positive electrode active material for a nonaqueous electrolyte secondary battery containing at least a lithium-transition metal composite oxide of a spinel structure, in which fluorine exists on at least a surface of the lithium-transition metal composite oxide, and concentration of the fluorine on the surface of the lithium-transition metal composite oxide is higher than concentration of the fluorine inside the lithium-transition metal composite oxide.

Further, according to the second aspect of the present invention, it is preferable that magnesium exists on at least the surface of the lithium-transition metal composite oxide, and concentration of the magnesium on the surface of the lithium-transition metal composite oxide is higher than concentration of the magnesium inside the lithium-transition metal composite oxide.

Further, according to the second aspect of the present invention, it is preferable that the concentration of the magnesium inside the lithium-transition metal composite oxide is higher than the concentration of the fluorine inside the lithium-transition metal composite oxide.

Further, according to the second aspect of the present invention, it is preferable that boron exists on at least the surface of the lithium-transition metal composite oxide, and concentration of the boron on the surface of the lithium-transition metal composite oxide is higher than concentration of the boron inside the lithium-transition metal composite oxide.

The third aspect of the present invention provides a positive electrode active material for a nonaqueous electrolyte secondary battery containing at least a lithium-transition metal composite oxide of a spinel structure, in which boron and magnesium exist on at least a surface of the lithium-transition metal composite oxide, concentration of the boron on the surface of the lithium-transition metal composite oxide is higher than concentration of the boron inside the lithium-transition metal composite oxide, and concentration of the magnesium on the surface of the lithium-transition metal composite oxide is higher than concentration of the magnesium inside the lithium-transition metal composite oxide.

According to the third aspect of the present invention, it is preferable that the concentration of the magnesium inside the lithium-transition metal composite oxide is higher than the concentration of the boron inside the lithium-transition metal composite oxide.

Further, according to the third aspect of the present invention, it is preferable that the lithium-transition metal composite oxide contains titanium, and concentration of the titanium inside the lithium-transition metal composite oxide is higher than the concentration of the boron inside the lithium-transition metal composite oxide.

The positive electrode active material for a nonaqueous electrolyte secondary battery according to the present invention only needs to correspond to any one of the first, second, and third aspects described above, but may preferably correspond to two or more of the aspects described above.

Further, the present invention provides a positive electrode mixture containing the positive electrode active material for a nonaqueous electrolyte secondary battery according to the first aspect of the present invention and a conductive agent, in which the element which may become tetravalent exists between the positive electrode active material for a nonaqueous electrolyte secondary battery and the conductive agent.

Further, the present invention provides a nonaqueous electrolyte secondary battery including:

a strip positive electrode constituted by forming, on at least one side of a strip positive electrode current collector, a positive electrode active material layer employing the positive electrode active material for a nonaqueous electrolyte secondary battery according to any one of the first, second, and third aspects of the present invention;

a strip negative electrode constituted by forming, on at least one side of a strip negative electrode current collector, a negative electrode active material layer employing, as a negative electrode active material, a lithium metal, a lithium alloy, a carbon material capable of intercalating and deintercalating lithium ions or a compound capable of intercalating and deintercalating the lithium ions; and a strip separator, in which the strip positive electrode and the strip negative electrode laminated with the strip separator between the strip positive electrode and the strip negative electrode are wound plural times to form a winding of the strip positive electrode and the strip negative electrode with the strip separator intervening between the strip positive electrode and the strip negative electrode.

The nonaqueous electrolyte secondary battery of the present invention preferably employs the positive electrode mixture for a nonaqueous electrolyte secondary battery of the present invention when employing the positive electrode active material for a nonaqueous electrolyte secondary battery according to the first aspect of the present invention.

As described below, a use of the positive electrode active material according to the first aspect of the present invention can improve cycle characteristics and high rate characteristics without reducing the charge-discharge capacity of the lithium-transition metal composite oxide.

The use of the positive electrode active material according to the second aspect of the present invention can improve high-temperature cycle characteristics by improving polar plate density of the nonaqueous electrolyte secondary battery and suppressing gas generation during high-temperature storage. Thus, a nonaqueous electrolyte secondary battery having excellent battery characteristics which could not be attained before can be realized, to thereby allow applications in various fields.

The use of the positive electrode active material according to the third aspect of the present invention allows effective growth of a primary particle size of particles because the concentration of boron existing on the surface of the lithium-transition metal composite oxide is higher than the concentration of boron existing inside the lithium-transition metal composite oxide. Further, the positive electrode active material according to the third aspect of the present invention can suppress elution of transition metal ions into an electrolytic solution because the concentration of magnesium existing on the surface of the lithium-transition metal composite oxide is higher than the concentration of magnesium existing inside the lithium-transition metal composite oxide.

As a result, filling ability of the particles and the polar plate density improve, to thereby increase the charge-discharge capacity per unit volume of the battery and provide excellent high-temperature cycle characteristics.

DETAILED DESCRIPTION OF THE INVENTION

Hereinafter, a positive electrode active material, a positive electrode mixture, and a nonaqueous electrolyte secondary battery of the present invention will be described in detail. However, the present invention is not limited to embodiments described below. First, the positive electrode active material of the present invention will be described.

<Positive Electrode Active Material for Nonaqueous Electrolyte Secondary Battery>

The positive electrode active material according to the present invention contains at least a lithium-transition metal composite oxide of a spinel structure (spinel type crystal structure). The term "spinel structure" means a typical crystal structure for a composite oxide which is an $AB_2O_4$ type compound (A and B represent metal elements).

Figure 2:
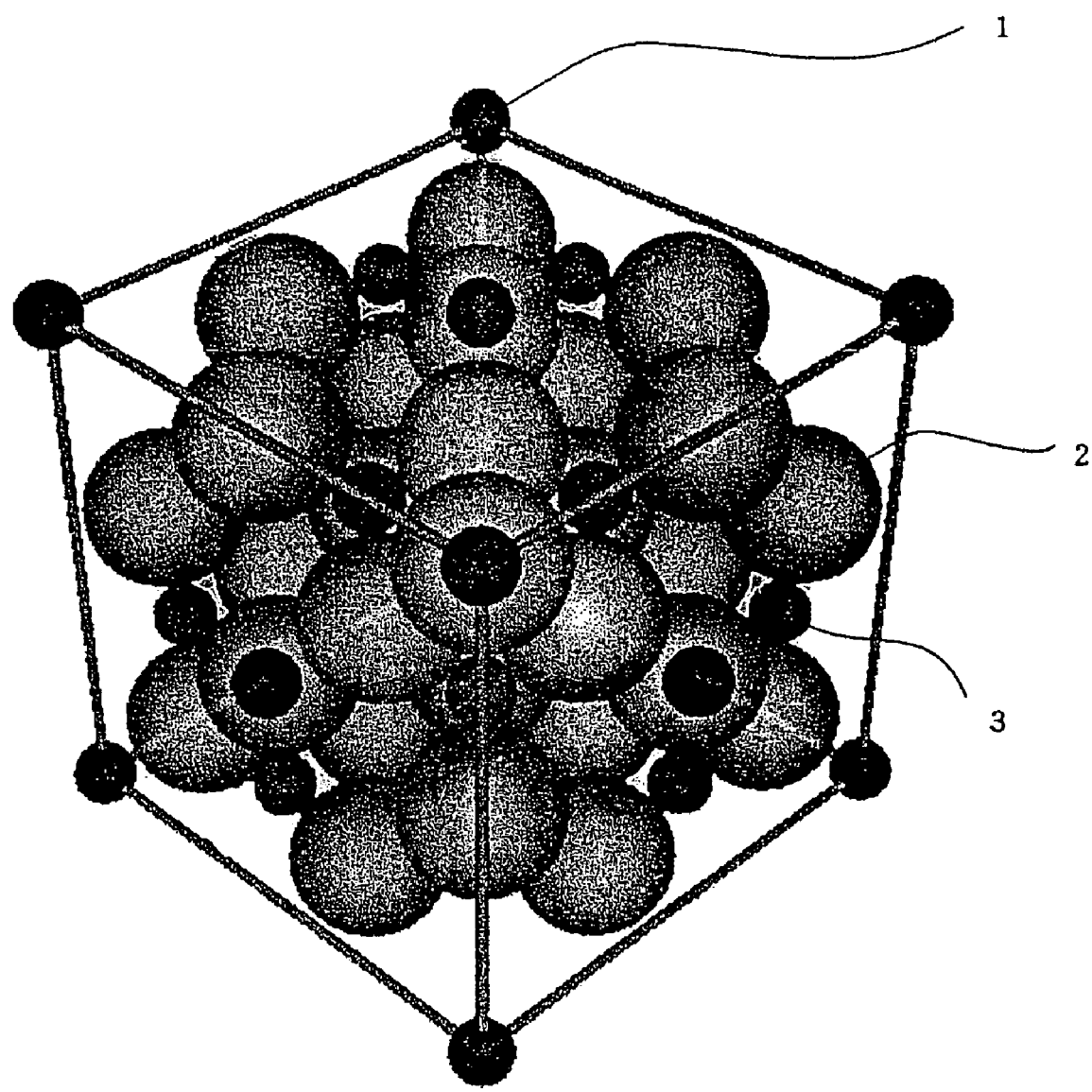
FIG. 2 is a schematic diagram showing a crystal structure of a lithium-transition oxide of a spinel structure.

FIG. 2 is a schematic diagram showing a crystal structure of a lithium-transition metal composite oxide of a spinel structure. In FIG. 2, lithium atoms 1, oxygen atoms 2, and transition metal atoms 3 (and optionally excess lithium atoms) occupy tetrahedral sites of 8a sites, 32e sites, and octahedral sites of 16d sites, respectively.

Examples of the lithium-transition metal composite oxide of a spinel structure include a lithium manganese composite oxide, a lithium titanium composite oxide, a lithium manganese nickel composite oxide, and a lithium manganese cobalt composite oxide. Of those, the lithium manganese composite oxide is preferable.

In the positive electrode active material according to the present invention, a form of the lithium-transition metal composite oxide is not particularly limited. The lithium-transition metal composite oxide may be in a form of particles, films, or the like.

According to the present invention, the lithium-transition metal composite oxide is preferably in a form of particles such that an element which may become tetravalent or the like described below is uniformly dispersed in the lithium-transition metal composite oxide, thereby providing better battery characteristics.

Further, according to the present invention, the lithium-transition metal composite oxide may exist in a form of particles consisting of at least one of primary particles and secondary particles, which are aggregates of the primary particles. That is, the lithium-transition metal composite oxide may exist in a form of particles, and the particles may consist of: primary particles alone; secondary particles alone which are aggregates of the primary particles; and both primary particles and secondary particles.

In the positive electrode active material according to the first aspect of the present invention, at least one kind of element which may become tetravalent exists on at least a surface of the lithium-transition metal composite oxide, and concentration of the element which may become tetravalent on the surface of the lithium-transition metal composite oxide is higher than the concentration of the element which may become tetravalent inside the lithium-transition metal composite oxide.

Note that, according to the present invention, the term "surface of lithium-transition metal composite oxide" refers to a region at a depth of 0 μm or more and 0.1 μm or less from the surface of the lithium-transition metal composite oxide. The term "surface of lithium-transition metal composite oxide" refers to a region at a depth of 0 μm or more and 0.1 μm or less from the surface of lithium-transition metal composite oxide particles when the lithium-transition metal composite oxide exists in a form of particles.

The element which may become tetravalent likely catalyses an intercalation and deintercalation reaction of lithium in the lithium-transition metal composite oxide. The intercalation and deintercalation reaction of lithium readily takes place, to thereby provide excellent cycle characteristics and high rate characteristics. The catalytic action may be caused in the uniform presence of the element which may become tetravalent inside the lithium-transition metal oxide, but particularly effective catalytic action may be caused in the presence of the element which may become tetravalent on the surface.

The element which may become tetravalent must exist uniformly in a large amount inside the lithium-transition metal composite oxide for providing the catalytic action described above. Thus, a ratio of the lithium-transition metal composite oxide in the positive electrode active material decreases, thereby undesirably reducing the charge-discharge capacity.

On the other hand, in the positive electrode active material according to the first aspect of the present invention, the concentration of the element which may become tetravalent existing on the surface of the lithium-transition metal composite oxide is higher than the concentration of the element which may become tetravalent existing inside the lithium-transition metal composite oxide. Thus, the above catalytic action can be obtained without reducing the charge-discharge capacity of the lithium-transition metal composite oxide, to thereby provide excellent cycle characteristics and high rate characteristics.

Further, the positive electrode active material according to the first aspect of the present invention provides excellent cycle characteristics and high rate characteristics from the following points.

Figure 8:
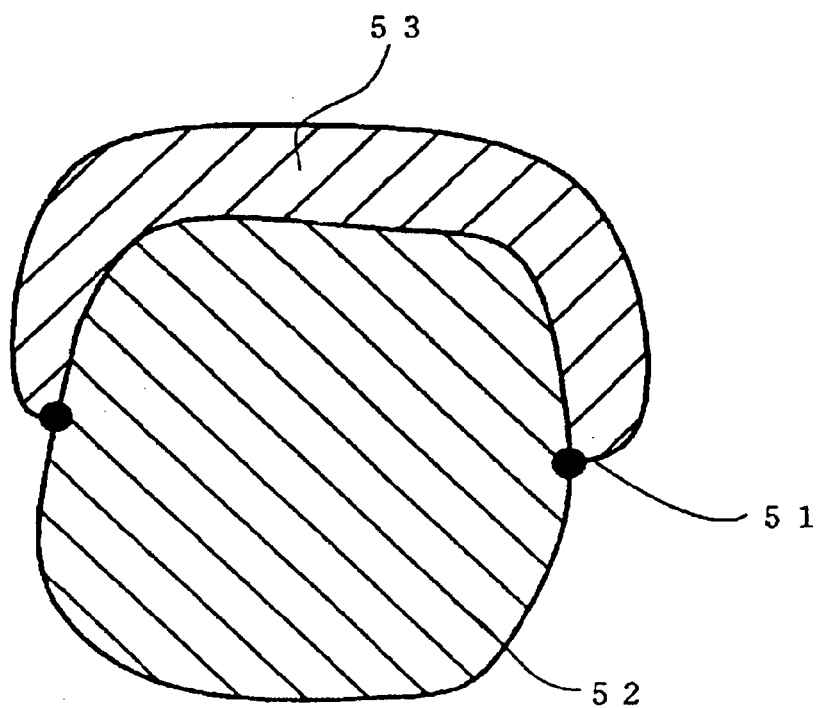
FIG. 8 is a schematic diagram showing how the conventional positive electrode active material and a conductive agent exist.

FIG. 8 is a schematic diagram showing how the conventional positive electrode active material and a conductive agent exist. Intercalation and deintercalation of lithium diffused from the inside to a surface of a positive electrode active material 52 is assumed to occur generally at a three-phase interface 51 of mainly the positive electrode active material 52, a conductive agent 53, and an electrolyte (blank portion surrounding the positive electrode active material 52 and the conductive agent 53 in FIG. 8). At the three-phase interface 51, lithium continuously drawn from the positive electrode active material dissociates into lithium ions and electrons during charge, and the lithium ions and the electrons are respectively delivered to the electrolyte and the conductive agent 53. An opposite reaction occurs during discharge. Therefore, the larger the number (or the longer the length) of the three-phase interface 51 where the lithium intercalates and deintercalates is, the more the battery characteristics improve.

Figure 7:
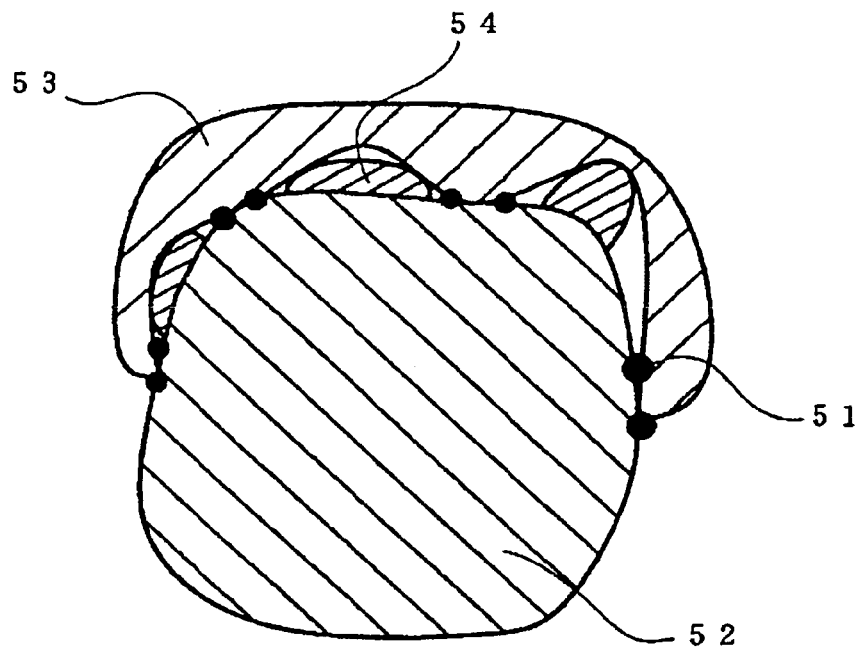
FIG. 7 is a schematic diagram showing how the positive electrode active material according to the first aspect of the present invention and a conductive agent exist.

FIG. 7 shows a schematic diagram showing how the positive electrode active material according to the first aspect of the present invention and a conductive agent exist. In the positive electrode active material according to the first aspect of the present invention, an element 54 which may become tetravalent prevents the conductive agent 53 from excessively covering the positive electrode active material 52 containing the lithium-transition metal composite oxide as shown in FIG. 7. Thus, the three-phase interface 51 is probably increased compared to that of the conventional positive electrode active material shown in FIG. 8. As a result, the positive electrode active material according to the first aspect of the present invention provides excellent cycle characteristics and high rate characteristics, also for the reason that the element which may become tetravalent increases the three-phase interface.

The element which may become tetravalent existing in any form on the surface of lithium-transition metal composite oxide exhibits an effect of the present invention. The cycle characteristics and high rate characteristics can be improved either when the element which may become tetravalent covers the entire surface of the lithium-transition metal composite oxide or when the element which may become tetravalent covers a part of the surface of the lithium-transition metal composite oxide, for example. The element which may become tetravalent preferably covers a part of the surface of the lithium-transition metal composite oxide, to thereby further improve the cycle characteristics and high rate characteristics.

Further, the element which may become tetravalent only needs to exist on at least the surface of the lithium-transition metal composite oxide. Therefore, a part of the element which may become tetravalent may exist inside the lithium-transition metal composite oxide. The existence state of the element which may become tetravalent on the surface of the lithium-transition metal composite oxide is not particularly limited, and the element which may be tetravalent may exist as a compound. The compound of the element which may become tetravalent is preferably an oxide and/or lithium compound of the element which may become tetravalent.

The element which may become tetravalent preferably adheres on the surface of the lithium-transition metal composite oxide. According to the present invention, the term "adhering" refers to a state of the element which may become tetravalent not liberating from the lithium-transition metal composite oxide even when the positive electrode active material of the present invention is stirred in water or an organic solvent. The element which may become tetravalent may undesirably liberate from the surface of the lithium-transition metal composite oxide during slurry preparation, if the element which may become tetravalent does not adhere to the surface of the lithium-transition metal composite oxide.

Examples of the element which may become tetravalent include titanium, zirconium, hafnium, and cerium. Of those, zirconium and/or cerium are preferable.

Zirconium and/or cerium likely causes the effective catalytic action described above, to thereby provide excellent cycle characteristics and high rate characteristics.

In the positive electrode active material according to the first aspect of the present invention, the lithium-transition metal composite oxide preferably contains magnesium.

Magnesium has an effect of increasing a lattice constant of the lithium-transition composite oxide and likely facilitates diffusion of lithium inside the lithium-transition metal composite oxide.

Therefore, the lithium-transition metal composite oxide containing magnesium improves diffusion of lithium, to thereby improve the cycle characteristics, high rate characteristics, and high-temperature cycle characteristics.

Magnesium may exist on the surface of the lithium-transition metal composite oxide or may exist as a solid solution with the lithium-transition metal composite oxide. The existence state of magnesium on the surface of the lithium-transition metal composite oxide is not particularly limited, and magnesium may exist as a compound.

Examples of a preferable magnesium compound include magnesium oxide, magnesium carbonate, and magnesium hydroxide.

Of those, magnesium preferably exists on at least the surface of the lithium-transition metal composite oxide, and the concentration of magnesium existing on the surface of the lithium-transition metal composite oxide is preferably higher than the concentration of magnesium existing inside the lithium-transition metal composite oxide.

The higher concentration of magnesium existing on the surface of the lithium-transition metal composite oxide compared to the concentration of magnesium existing inside the lithium-transition metal composite oxide can likely suppress decrease of the charge-discharge capacity within a range of a practically acceptable level and suppress elution of the transition metal ions into the electrolyte. Thus, high-temperature cycle characteristics can be improved without hindering improvements in cycle characteristics and high rate characteristics.

Further, the concentration of magnesium inside the lithium-transition metal composite oxide is preferably higher than the concentration of the element which may become tetravalent inside the lithium-transition metal composite oxide.

The higher concentration of magnesium inside the lithium-transition metal composite oxide compared to the concentration of the element which may become tetravalent inside the lithium-transition metal composite oxide can likely suppress deterioration in crystallinity of the lithium-transition metal composite oxide effectively. Thus, high-temperature characteristics can be improved without hindering improvements in cycle characteristics and high rate characteristics.

In the positive electrode active material according to the first aspect of the present invention, the lithium-transition metal composite oxide preferably contains boron on at least the surface thereof. Inclusion of boron on the surface allows the effective growth of the primary particle size, to thereby improve the filling ability of the particles and polar plate density. Thus, the charge-discharge capacity per unit volume of the battery increases.

Boron existing in any form on the surface of the lithium-transition metal composite oxide exhibits the effect of the present invention. The polar plate density can be improved either when boron covers the entire particle surface or when boron covers a part of the particle surface, for example.

Further, boron only needs to exist on at least the surface of the particles. Therefore, a part of boron may exist inside the particles. The existence state of boron on the particle surface is not particularly limited, and boron may exist as a compound. The boron compound is preferably lithium borate.

In particular, the concentration of boron on the surface of the lithium-transition metal composite oxide is preferably higher than the concentration of boron inside the lithium-transition metal composite oxide, to thereby efficiently provide an effect of increasing the primary particle size.

According to the first aspect of the present invention, a content of the element which may become tetravalent is preferably 5 wt % or more, more preferably 10 wt % or more, and is preferably 90 wt % or less, more preferably 50 wt % or less with respect to the total of the element which may become tetravalent and magnesium when the lithium-transition metal composite oxide contains magnesium, but is free of boron.

According to the first aspect of the present invention, the content of the element which may become tetravalent is preferably 4 wt % or more, more preferably 8 wt % or more, and is preferably 90 wt % or less, more preferably 50 wt % or less with respect to the total of the element which may become tetravalent, magnesium, and boron when the lithium-transition metal composite oxide contains magnesium and boron.

The content of the element which may become tetravalent within the above range provides better charge-discharge capacity, charge-discharge efficiency, high rate characteristics, and cycle characteristics.

According to the first aspect of the present invention, a magnesium content is preferably 6 wt % or more, more preferably 12 wt % or more, and is preferably 95 wt % or less, more preferably 60 wt % or less with respect to the total of the element which may become tetravalent and magnesium when the lithium-transition metal composite oxide contains magnesium, but is free of boron.

According to the first aspect of the present invention, the magnesium content is preferably 4 wt % or more, more preferably 12 wt % or more, and is preferably 95 wt % or less, more preferably 60 wt % or less with respect to the total of the element which may become tetravalent, magnesium, and boron when the lithium-transition metal composite oxide contains magnesium and boron.

The magnesium content within the above range reduces $Mn^{3+}$ and prevents decrease of an initial capacity. Further, such a magnesium content prevents elution of transition metal ions causing gas generation, to thereby provide better high-temperature characteristics.

According to the first aspect of the present invention, a boron content is preferably 0.4 wt % or more, more preferably 0.8 wt % or more, and is preferably 40 wt % or less, more preferably 20 wt % or less with respect to the total of the element which may become tetravalent, magnesium, and boron when the lithium-transition metal composite oxide contains magnesium and boron.

The boron content within the above range provides a better initial capacity. Further, such a boron content prevents elution of transition metal ions causing gas generation, to thereby provide better high-temperature characteristics. Further, the primary particle size grows, thereby providing excellent filling ability of the particles.

Further, according to another embodiment of the first aspect of the present invention, the element which may become tetravalent exists on at least the surface of the lithium-transition metal composite oxide, and the lithium-transition metal composite oxide contains magnesium.

The embodiment, similarly to the embodiment described above, provides excellent cycle characteristics and high rate characteristics through a catalytic action and increase of a three-phase interface by the element which may become tetravalent.

In the positive electrode active material according to the second aspect of the present invention, fluorine exists on at least the surface of the lithium-transition metal composite oxide, and the concentration of fluorine on the surface is higher than the concentration of fluorine inside the lithium-transition metal composite oxide.

Examples of methods of improving the charge-discharge capacity of the battery includes: a method of increasing the charge-discharge capacity per weight of the positive electrode active material; a method of improving an application method of the positive electrode active material to the positive electrode; and a method of improving the polar plate density.

Further, according to the positive electrode active material containing the lithium-transition metal composite oxide of a spinel structure, elution of the transition metal ions causes precipitation of transition metals at the negative electrode. Thus, the reaction of the lithium ions contributing to charge and discharge deactivates lithium, thereby causing a disadvantage of reducing the charge-discharge capacity. The elution of the transition metal ions easily takes place during an operation of the battery at high temperatures.

According to the second aspect of the present invention, the higher concentration of fluorine on the surface of the lithium-transition metal composite oxide compared to the concentration of fluorine inside the lithium-transition metal composite oxide can further promote the growth of the primary particle size. Further, dispersibility of the primary particles can be improved. As a result, the filling ability of the particles and polar plate density can be improved, to thereby improve the charge-discharge capacity per unit volume of the battery.

In the positive electrode active material according to the second aspect of the present invention, the lithium-transition metal composite oxide preferably contains magnesium.

The inclusion of magnesium can reduce the elution of the transition metal ions, suppress the gas generation during high-temperature storage, and improve the high-temperature cycle characteristics without hindering the growth of the primary particle size and improvements in the dispersibility of the primary particles.

Magnesium may exist on the surface of the lithium-transition metal composite oxide or may exist as a solid solution with the lithium-transition metal composite oxide.

The existence state of magnesium on the surface of the lithium-transition metal composite oxide is not particularly limited, and magnesium may exist as a compound.

The above exemplified compounds may be preferably used as the magnesium compound.

In particular, magnesium preferably exists on at least the surface of the lithium-transition metal composite oxide, and the concentration of magnesium existing on the surface of the lithium-transition metal composite oxide is preferably higher than the concentration of magnesium existing inside the lithium-transition metal composite oxide.

The higher concentration of magnesium existing on the surface of the lithium-transition metal composite oxide compared to the concentration of magnesium existing inside the lithium-transition metal composite oxide can effectively suppress the elution of the transition metal ions. Thus, the gas generation can be suppressed during high-temperature storage, and the high-temperature cycle characteristics can be improved.

Further, in the positive electrode active material of the second aspect according to the present invention, the concentration of magnesium inside the lithium-transition metal composite oxide is preferably higher than the concentration of fluorine inside the lithium-transition metal composite oxide.

The higher concentration of magnesium existing inside the lithium-transition metal composite oxide than the concentration of fluorine existing inside the lithium-transition metal composite oxide can further suppress the elution of the transition metal ions without hindering improvements in the dispersibility of the primary particles. Thus, the gas generation can be suppressed during high-temperature storage and high-temperature cycle characteristics can be improved.

Further, in the positive electrode active material according to the second aspect of the present invention, boron exists at least on the surface of the lithium-transition metal composite oxide, and the concentration of boron on the surface of the lithium-transition metal composite oxide is preferably higher than the concentration of boron inside the lithium-transition metal composite oxide. Thus, a synergistic effect with fluorine can further promote the growth of the primary particle size.

Further, the concentration of magnesium existing inside the lithium-transition metal composite oxide particles is preferably higher than the concentration of boron existing inside the lithium-transition metal composite oxide particles, to thereby allow suppression of the elution of the transition metal ions, suppression of the gas generation during high-temperature storage, and improvements in high-temperature cycle characteristics without hindering the growth of the primary particle size.

Fluorine and boron existing in any form on the surface of the lithium-transition metal composite oxide exhibit the effect of the present invention. The filling ability of the particles and polar plate density can be improved either when fluorine and boron cover the entire surface of the lithium-transition metal composite oxide particles or when fluorine and boron cover a part of the surface of the lithium-transition metal composite oxide particles, for example.

Further, fluorine and boron only need to exist on at least the surface of the lithium-transition metal composite oxide. Therefore, a part of fluorine and boron may exist inside the lithium-transition metal composite oxide. The existence states of fluorine and boron on the surface of the lithium-transition metal composite oxide are not particularly limited, and fluorine and boron may exist as compounds. The boron compound is preferably lithium borate, and the fluorine compound is preferably lithium fluoride.

Further, according to another embodiment of the second aspect of the present invention, fluorine and boron exist on at least the surface of the lithium-transition metal composite oxide, and the lithium-transition metal composite oxide contains magnesium.

The inclusion of fluorine and boron on the particle surface allows the growth of the primary particle size and improvements in the dispersibility of the primary particles.

Further, the inclusion of magnesium in the lithium-transition metal composite oxide can reduce the elution of the transition metal ions, suppress the gas generation during high-temperature storage, and improve the high-temperature cycle characteristics without hindering the growth of the primary particle size and improvements in the dispersibility of the primary particles.

Thus, the polar plate density can be improved, the gas generation can be suppressed during high-temperature storage, and the high-temperature cycle characteristics can be improved.

According to the second aspect of the present invention, a fluorine content is preferably 2.1 wt % or more, more preferably 4.1 wt % or more, even more preferably 7.9 wt % or more, and is preferably 95.2 wt % or less, more preferably 90.9 wt % or less, even more preferably 83.3 wt % or less with respect to the total of fluorine, magnesium, and boron when the lithium-transition metal composite oxide contains fluorine, magnesium, and boron.

The fluorine content within the above range provides increased dispersibility and better filling ability of the particles. Further, such a fluorine content allows the growth of the primary particle size, to thereby provide better filling ability of the particles.

According to the second aspect of the present invention, a magnesium content is preferably 3.7 wt % or more, more preferably 13.3 wt % or more, even more preferably 23.5 wt % or more, and is preferably 97.0 wt % or less, more preferably 96.2 wt % or less, even more preferably 95.2 wt % or less with respect to the total of fluorine, magnesium, and boron when the lithium-transition metal composite oxide contains fluorine, magnesium, and boron.

The magnesium content within the above range prevents increase of magnesium which cannot be incorporated into transition metal sites of the solid solution, to thereby provide better initial capacity. Further, such a magnesium content prevents increase of the elution of the transition metal ions causing gas generation, to thereby provide better high-temperature characteristics.

According to the second aspect of the present invention, a boron content is preferably 0.4 wt % or more, more preferably 0.8 wt % or more, and is preferably 55.6 wt % or less, more preferably 42.9 wt % or less with respect to the total of fluorine, magnesium, and boron when the lithium-transition metal composite oxide contains fluorine, magnesium, and boron.

The boron content within the above range provides even better initial capacity. Further, such a boron content prevents increase of the elution of the transition metal ions causing gas generation, to thereby provide better high-temperature characteristics. Further, such a boron content allows the growth of the primary particle size, thereby providing better filling ability of the particles.

According to the second aspect of the present invention, as a preferred aspect thereof, the lithium-transition metal composite oxide as particles preferably contains an element and/or compound such as fluorine for enlarging the primary particle size and an element and/or compound increasing all of D10, D50, and D90 where D10, D50, and D90 refer to particle sizes when volume-based cumulative frequency in a particle size distribution reaches 10%, 50%, and 90%, respectively.

Examples of methods of measuring the particle size distribution include screening, image analysis, precipitation method, laser diffraction scattering, and electrical detection.

The element and/or compound for enlarging the primary particle size is not particularly limited, and examples thereof include vanadium, ammonium chloride, and orthophosphoric acid, in addition to fluorine and boron as described above.

The element and/or compound for increasing all of D10, D50, and D90 is not particularly limited, and examples thereof include vanadium, ammonium chloride, and orthophosphoric acid, in addition to fluorine and boron as described above.

The inclusion of the element and/or compound for increasing all of D10, D50, and D90 improves the dispersibility of the particles. The inclusion of the element and/or compound such as fluorine for enlarging the primary particle size and the element and/or compound for increasing all of D10, D50, and D90 can improve the filling ability of the particles and polar plate density.

D10, D50, and D90 preferably satisfy all of the following equations.

$$0.14 \leq (D10/D50) \leq 0.25$$

$$2.00 \leq (D90/D50) \leq 3.00$$

$$5\ \mu m \leq D50 \leq 15\ \mu m$$

D10, D50, and D90 satisfying the above equations can further improve the polar plate density without hindering suppression of the gas generation during high-temperature storage and improvements in high-temperature cycle characteristics.

Further, D10, D50, and D90 are represented by suitable relational expressions depending on purposes and applications. All of the following equations are preferably satisfied for further improving the polar plate density, for example.

$$0.145 \leq (D10/D50) \leq 0.24$$

$$2.30 \leq (D90/D50) \leq 2.90$$

$$5\ \mu m \leq D50 \leq 15\ \mu m$$

According to the second aspect of the present invention, the lithium-transition metal composite oxide as particles has a specific surface area of preferably 0.4 to 1.0 m$^2$/g, more preferably 0.5 to 0.8 m$^2$/g. The specific surface area within the above range can further improve the polar plate density without hindering suppression of the gas generation during high-temperature storage and improvements in high-temperature cycle characteristics.

The specific surface area can be measured through a nitrogen gas adsorption method.

According to the second aspect of the present invention, the lithium-transition metal composite oxide as particles has an equivalent specific surface diameter of preferably 3.0 to 5.0 μm, more preferably 3.5 to 4.0 μm. The equivalent specific surface diameter within the above range can further improve the polar plate density without hindering suppression of the gas generation during high-temperature storage and improvements in high-temperature cycle characteristics.

The equivalent specific surface diameter can be measured through an air permeability method using Fisher Sub-Sieve Sizer (F.S.S.S.).

In the positive electrode active material according to the third aspect of the present invention, boron and magnesium exist on at least the surface of the lithium-transition metal composite oxide. The concentration of boron existing on the surface is higher than the concentration of boron existing inside the lithium-transition metal composite oxide, and the concentration of magnesium existing on the surface is higher than the concentration of magnesium existing inside the lithium-transition metal composite oxide.

The higher concentration of boron existing on the surface of the lithium-transition metal composite oxide compared to the concentration of boron existing inside the lithium-transition metal composite oxide allows the effective growth of the primary particle size. Further, the higher concentration of magnesium existing on the surface of the lithium-transition metal composite oxide compared to the concentration of magnesium existing inside the lithium-transition metal composite oxide can likely suppress the decrease of the charge-discharge capacity within a range of a practically acceptable level and suppress the elution of the transition metal ions into the electrolytic solution.

Thus, the filling ability of the particles and polar plate density can be improved, to thereby provide excellent charge-discharge capacity per unit volume of the battery and excellent high-temperature cycle characteristics.

Boron existing in any form on the surface of the lithium-transition metal composite oxide particles exhibits the effect of the present invention. The polar plate density can be improved either when boron covers the entire particle surface or when boron covers a part of the particle surface, for example.

Further, boron only needs to exist on at least the surface of the particles. Therefore, a part of boron may exist inside the particles. The existence state of boron on the particle surface is not particularly limited, and boron may exist as a compound. The boron compound is preferably lithium borate.

Magnesium only needs to exist on at least the surface of the particles. Therefore, a part of magnesium may exist inside the particles. The existence state of magnesium on the particle surface is not particularly limited, and magnesium may exist as a compound. Preferable examples of the magnesium compound include magnesium oxide, magnesium carbonate, and magnesium hydroxide.

In the positive electrode active material according to the third aspect of the present invention, the concentration of magnesium inside the lithium-transition metal composite oxide is preferably higher than the concentration of boron inside the lithium-transition metal composite oxide. Thus, the elution of the transition metal ions into an electrolytic solution can be further suppressed without hindering the growth of the primary particle size.

Further, according to the positive electrode active material of the third aspect of the present invention as a preferred aspect thereof, the lithium-transition metal composite oxide preferably contains titanium, and the concentration of titanium inside the lithium-transition metal composite oxide is higher than the concentration of boron inside the lithium-transition metal composite oxide. Thus, a lattice constant of the lithium-transition metal composite oxide can be increased without hindering the growth of the primary particle size, to thereby provide better high rate characteristics and cycle characteristics.

As described above, in the positive electrode active material according to the third aspect of the present invention, the concentration of magnesium on the surface is higher than the concentration of magnesium inside the lithium-transition metal composite oxide. Thus, high-temperature cycle characteristics are improved without decreasing the charge-discharge capacity.

In addition, the lattice constant of lithium manganate can be increased by incorporating titanium in the lithium-transition metal composite oxide as a solid solution. Thus, dispersibility of Li ions in a lithium-transition metal composite oxide crystal improves without hindering improvements in high-temperature cycle characteristics, to thereby improve the high rate characteristics. Further, the improvements in the dispersibility of Li ions likely suppress distortion of a lithium manganate crystal through charge-discharge cycles, to thereby improve the cycle characteristics.

Titanium may exist on the particle surface or may exist as a solid solution in the particles. The existence state of titanium on the particle surface is not particularly limited, and titanium may exist as a compound. Preferable examples of the titanium compound include titanium oxide and lithium titanate.

According to the third aspect of the present invention, a boron content is preferably 0.4 wt % or more, more preferably 1.0 wt % or more, even more preferably 2.0 wt % or more, and is preferably 55.6 wt % or less, more preferably 16.0 wt % or less, even more preferably 8.0 wt % or less with respect to the total of boron, magnesium, and titanium when the lithium-transition metal composite oxide contains titanium.

The boron content within the above range provides even better initial capacity. Further, such a boron content prevents increase of the elution of the transition metal ions causing gas generation, to thereby provide better high-temperature characteristics. Further, such a boron content allows the growth of the primary particle size, thereby providing better filling ability of the particles.

According to the third aspect of the present invention, a magnesium content is preferably 3.7 wt % or more, more preferably 8.0 wt % or more, even more preferably 30.0 wt % or more, and is preferably 97.0 wt % or less, more preferably 83.0 wt % or less, even more preferably 75.0 wt % or less with respect to the total of boron, magnesium, and titanium when the lithium-transition metal composite oxide contains titanium.

The magnesium content within the above range prevents increase of magnesium which cannot be incorporated into transition metal sites of the solid solution, to thereby provide better initial capacity. Further, such a magnesium content prevents increase of the elution of the transition metal ions causing gas generation, to thereby provide better high-temperature characteristics.

According to the third aspect of the present invention, a titanium content is preferably 2.1 wt % or more, more preferably 8.0 wt % or more, even more preferably 20.0 wt % or more, and is preferably 95.2 wt % or less, more preferably 90.0 wt % or less, even more preferably 55.0 wt % or less with respect to the total of boron, magnesium, and titanium when the lithium-transition metal composite oxide contains titanium.

The titanium content within the above range provides better charge-discharge efficiency, high rate characteristics, and cycle characteristics. Further, the dispersibility of lithium ions further improves and internal resistance in the positive electrode active material reduces, to improve an average potential.

Further, according to another embodiment of the third aspect of the present invention, the lithium-transition metal composite oxide is represented by the general formula $Li_{1+a}Mg_bTi_cMn_{2-a-b-c}O_{4+e}$, (where, $-0.2 \leq a \leq 0.2$, $0.005 \leq b \leq 0.10$, $0.005 \leq c \leq 0.05$, and $-0.5 \leq e \leq 0.5$), and an Mn/Mg mole ratio on the surface of the lithium-transition metal composite oxide is less than $(2-a-b-c)/b$.

According to this embodiment, distribution states of Mg and Ti in the lithium manganate crystal are controlled.

Incorporation of Mg in the lithium manganate as a solid solution improves the high-temperature cycle characteristics, but reduces manganese ions having +3 valence, to thereby decrease the charge-discharge capacity. Therefore, according to this embodiment, the concentration of Mg has a gradient between the surface and the inside of the lithium manganate particles.

That is, the Mn/Mg mole ratio on the surface of the lithium-transition metal composite oxide particles of less than $(2-a-b-c)/b$ can suppress the decrease of the charge-discharge capacity due to incorporation of Mg as a solid solution within a range of a practically acceptable level and suppress the elution of Mn ions into the electrolytic solution, to thereby improve the high-temperature cycle characteristics.

The gradient of the concentration of Mg between the surface and the inside of the particles as described above sufficiently improves the high-temperature battery cycle characteristics, but leaves room for improvements of the high rate characteristics and cycle characteristics.

Thus, according to this embodiment, Ti is incorporated into the lithium manganate as a solid solution. The incorporation of Ti as a solid solution can increase the lattice constant of the lithium manganate. Thus, the dispersibility of Li ions in the lithium manganate crystal improves without hindering improvements in high-temperature cycle characteristics, to thereby improve the high rate characteristics. Further, the improvements in the dispersibility of Li ions suppress the distortion of the lithium manganate crystal through charge-discharge cycles, thereby improving the cycle characteristics.

Further, according to another embodiment of the third aspect of the present invention, boron exists on at least the surface of the lithium-transition metal composite oxide, and the lithium-transition metal composite oxide contains magnesium and titanium.

The inclusion of boron on the particle surface allows the effective growth of the primary particle size.

Further, the inclusion of magnesium and titanium can suppress the elution of the transition metal ions into the electrolytic solution without hindering the growth of the primary particle size, to thereby allow increase of the lattice constant of the lithium-transition metal composite oxide.

Thus, the polar plate density can be improved, to thereby improve the high-temperature cycle characteristics, high rate characteristics, and cycle characteristics.

According to the present invention, the existence of the element which may become tetravalent, fluorine, boron, magnesium, or the like on the surface of the lithium-transition metal composite oxide can be analyzed through various methods. Examples of the methods include Auger electron spectroscopy (AES) and X-ray photoelectron spectroscopy (XPS).

Further, amounts of elements can be determined through various methods. Examples of the methods include inductively coupled plasma (ICP) spectroscopy and a titration method.

The positive electrode active material of the present invention preferably contains manganese as a transition metal. Containing manganese as the transition metal allows a nonaqueous electrolyte secondary battery employing the positive electrode active material of the present invention to have excellent cycle characteristics, high-temperature cycle characteristics, storage characteristics, and high rate characteristics, which can be particularly suitably used for applications such as cellular phones and electrically powered tools. Further, the nonaqueous electrolyte secondary battery also has excellent power characteristics, which can also be particularly suitably used for applications such as electric vehicles.

The positive electrode active material of the present invention is preferably a lithium manganese composite oxide, and a compositional ratio of Li, Mn, and O of the lithium manganese composite oxide represented by the general formula $Li_{1+a}Mn_{2-a}O_{4+d}$ preferably satisfies $-0.2 \leq a \leq 0.2$ and $-0.5 \leq d \leq 0.5$.

Here, a is more preferably larger than 0, more preferably 0.15 or smaller. Substitution of a part of manganese with lithium further likely improves the cycle characteristics.

Hereinafter, the lithium-transition metal composite oxide suitably used in the present invention will be exemplified. Note that all of the lithium-transition metal composite oxides contain at least on the surface the element which may become tetravalent (first aspect of the present invention), fluorine (second aspect of the present invention), or boron and magnesium (third aspect of the present invention).

(i) An aspect in which the lithium-transition metal composite oxide is represented by the general formula $Li_{1+a}Mg_bTi_cMn_{2-a-b-c}B_dO_{4+e}$ (where, $-0.2 \leq a \leq 0.2$, $0.005 \leq b \leq 0.10$, $0.005 \leq c \leq 0.05$, $0.002 \leq d \leq 0.02$, and $-0.5 \leq e \leq 0.5$).

The aspect (i) provides excellent cycle characteristics, high-temperature cycle characteristics, and high rate characteristics.

According to the aspect (i), a is preferably larger than 0. It is assumed that the substitution of a part of manganese with lithium improves the cycle characteristics.

According to the aspect (i), b is preferably 0.01 or larger, more preferably 0.02 or larger. Further, b is preferably 0.08 or smaller, more preferably 0.07 or smaller. Too large b reduces manganese ions having +3 valence, thereby decreasing the charge-discharge capacity. Too small b increases the elution of the transition metal ions causing gas generation, thereby deteriorating the high-temperature characteristics.

According to the aspect (i), c is preferably 0.01 or larger, more preferably 0.02 or larger. Further, c is preferably 0.08 or smaller, more preferably 0.07 or smaller. Too large c decreases the charge-discharge efficiency. Too small c prevents to obtain sufficient high rate characteristics and cycle characteristics.

According to the aspect (i), d is preferably 0.003 or larger, and is preferably 0.008 or smaller. Too large d decreases the initial capacity and increases the elution of the transition metal ions causing gas generation, thereby deteriorating the high-temperature characteristics. Too small d hinders the growth of the primary particle size, thereby not improving the filling ability of the particles.

(ii) An aspect in which the lithium-transition metal composite oxide is represented by the general formula $Li_{1+a}Mg_bMn_{2-a-b}B_cF_dO_{4+e}$ (where, $-0.2 \leq a \leq 0.2$, $0.005 \leq b \leq 0.10$, $0.002 \leq c \leq 0.02$, $0.0025 \leq d \leq 0.1$, and $-0.5 \leq e \leq 0.5$).

The aspect (ii) provides high polar plate density, excellent suppression of the gas generation during high-temperature storage, and excellent high-temperature cycle characteristics.

According to the aspect (ii), a is preferably larger than 0. It is assumed that the substitution of a part of manganese with lithium improves the cycle characteristics.

According to the aspect (ii), b is preferably 0.01 or larger, more preferably 0.02 or larger. Further, b is preferably 0.08 or smaller, more preferably 0.07 or smaller. Too large b increases an amount of magnesium which cannot be incorporated into the transition metal sites as a solid solution, thereby decreasing the initial capacity. Too small b increases the elution of the transition metal ions and causing gas generation, thereby deteriorating the high-temperature characteristics.

According to the aspect (ii), c is preferably 0.003 or larger, and is preferably 0.008 or smaller. Too large c decreases the initial capacity and increases the elution of the transition metal ions causing gas generation, thereby deteriorating the high-temperature characteristics. Too small c hinders the growth of the primary particle size, thereby not improving the filling ability of the particles.

According to the aspect (ii), d is preferably 0.005 or larger, more preferably 0.01 or larger. Further, d is preferably 0.05 or smaller, more preferably 0.03 or smaller. Too large d excessively increases the dispersibility of the particles, thereby deteriorating the filling ability of the particles. Too small d hinders the growth of the primary particle size, thereby not improving the filling ability of the particles.

(iii) An aspect in which the lithium-transition metal composite oxide is a lithium manganese composite oxide containing at least one element selected from the group consisting of titanium, zirconium, and hafnium.

Assumedly, the inclusion of at least one element selected from the group consisting of titanium, zirconium, and hafnium increases a lattice constant of a unit lattice of lithium manganese composite oxide particles and increases mobility of the lithium ions in the particles, allowing reduction of impedance. Thus, the power characteristics improve without hindering improvements in the cycle characteristics and high-temperature cycle characteristics.

(iv) An aspect in which the lithium-transition metal composite oxide is a lithium manganese composite oxide containing: at least one element selected from the group consisting of titanium, zirconium, and hafnium; and sulfur.

According to the aspect (iv), it is assumed that existence of sulfur allows electrons to pass therethrough more easily, thereby further improving the cycle characteristics and high rate characteristics.

The sulfur content is preferably 0.03 to 0.3 wt % with respect to the total of the lithium-transition metal composite oxide and sulfur. If the sulfur content is smaller than 0.03 wt %, resistance to electron migration may be hardly reduced. If the sulfur content is larger than 0.3 wt %, the battery may swell from moisture adsorption.

Sulfur may exist in any form. Sulfur may exist in a form of a sulfate group, for example.

The sulfate group includes a sulfate ion, a cluster of atoms of the sulfate ion with electrons removed, and a sulfo group. The sulfate group is preferably based on at least one selected from the group consisting of alkali metal sulfates, alkali earth metal sulfates, organic sulfates, organic sulfonic acids, and salts thereof.

Of those, the sulfate group is preferably based on at least one selected from the group consisting of alkali metal sulfates and alkali earth metal sulfates, and is more preferably based on alkali metal sulfates. The reason is because alkali metal sulfates are formed through bonding of a strong acid and a strong base and are chemically stable.

According to the aspect (iv), reasons for the inclusion of elements other than sulfur is the same as in the aspect (iii).

According to the aspect (iv), a synergistic effect of respective elements included provides a positive electrode plate having high charge-discharge capacity, excellent bindability, and excellent surface smoothness.

The lithium-transition metal composite oxide may contain a sulfate group on at least the particle surface.

It is assumed that the existence of the sulfate group on the particle surface of the lithium-transition metal composite oxide significantly reduces resistance to electron migration in the vicinity of particles. As a result, this supposedly facilitates the electron passage, improving cycle characteristics and high rate characteristics.

Further, assumedly, a high-voltage battery employing the positive electrode active material of the present invention (battery employing $LiMn_{1.5}Ni_{0.5}O_4$ for the lithium-transition metal composite oxide, for example) suppresses decomposition of the electrolyte during charge, which had been a problem in conventional high-voltage batteries, thereby improving the cycle characteristics. The decomposition reaction of the electrolyte supposedly occurs at an interface between the lithium-transition metal composite oxide particles and the electrolyte with the lithium-transition metal composite oxide serving as a catalyst. Covering the entire or a part of the particle surface of the lithium-transition metal composite oxide with the sulfate group, which has no function of decomposing the electrolyte, may reduce a contact area of the electrolyte and the catalyst, thereby suppressing the decomposition reaction.

According to the present invention, the sulfate group existing in any form on the particle surface of lithium-transition metal composite oxide exhibits the effect of the present invention. The cycle characteristics and the high rate characteristics improve either when the sulfate group covers the entire particle surface of the lithium-transition metal composite oxide or when the sulfate group covers a part of the particle surface of the lithium-transition metal composite oxide.

Further, the sulfate group only needs to exist on at least the particle surface. Therefore, a part of the sulfate group may exist inside the particles.

The existence of the sulfate group on the particle surface of the lithium-transition metal composite oxide can be analyzed through various methods. Examples of the methods include Auger electron spectroscopy and X-ray photoelectron spectroscopy.

Further, the amount of the sulfate group can be determined through various methods. Examples of the methods include inductively coupled plasma (ICP) spectrometry and a titration method.

(v) An aspect in which the lithium-transition metal composite oxide is a lithium manganese composite oxide containing: at least one element selected from the group consisting of titanium, zirconium, and hafnium; sulfur; and sodium and/or calcium.

According to the aspect (v), the inclusion of sodium and/or calcium further suppresses the elution of manganese ions owing to the synergistic effect with boron (preferably boron and sulfur), thereby realizing excellent cycle characteristics of a battery on a practically acceptable level.

According to the aspect (v), the reason for the inclusion of elements other than sodium and/or calcium is the same as those in the aspects (iii) and (iv).

(vi) An aspect in which the lithium-transition metal composite oxide is a lithium manganese composite oxide containing aluminum and/or magnesium.

The inclusion of aluminum and/or magnesium stabilizes the crystal structure of the lithium manganese composite oxide, provides excellent cycle characteristics without deteriorating the storage characteristics, the high rate characteristics, and the power characteristics, and further suppresses the swelling of the battery.

(vii) An aspect in which the lithium-transition metal composite oxide is a lithium manganese composite oxide containing aluminum and/or magnesium and boron.

Boron serves as a flux to accelerate crystal growth, and in addition, improves the cycle characteristics and storage characteristics.

(viii) An aspect in which the lithium-transition metal composite oxide is represented by the general formula $Li_{1+a}M_bMn_{2-a-b}B_cO_{4+d}$ (where, M represents aluminum and/or magnesium, $-0.2 \leq a \leq 0.2$, $0 \leq b \leq 0.2$, $0 \leq c \leq 0.02$, and $-0.5 \leq d \leq 0.5$).

The aspect (viii) provides excellent cycle characteristics, high rate characteristics, storage characteristics, and charge-discharge capacity and exhibits less swelling of the battery.

According to the aspect (viii), a is preferably larger than 0. It is assumed that the substitution of a part of manganese with lithium improves the cycle characteristics.

According to the aspect (viii), b is preferably larger than 0, more preferably 0.05 or larger. The inclusion of aluminum and/or magnesium stabilizes the crystal structure of the composite oxide, provides excellent cycle characteristics without deteriorating the storage characteristics, high rate characteristics, and power characteristics, and further suppresses the swelling of the battery b is preferably 0.15 or smaller. Too large b reduces the discharge capacity.

According to the aspect (viii), c is preferably larger than 0, more preferably 0.001 or larger. Boron serves as a flux to accelerate the crystal growth, and in addition, improves the cycle characteristics and storage characteristics. Further, c is preferably 0.01 or smaller. Too large c deteriorates the cycle characteristics.

The lithium-transition metal composite oxide has an iron content of preferably 25 ppm or less, more preferably 20 ppm or less, even more preferably 18 ppm or less. A too large iron content may cause an internal short circuit of the battery.

According to the first aspect of the present invention, a (400) crystallinity is preferably 720 Å or more, more preferably 750 Å or more, and is preferably 1,000 Å or less, more preferably 950 Å or less.

A (400) crystallinity of 1,000 Å or less shortens the diffusion path of lithium ions from inside of the crystal to the surface of the lithium-transition metal composite oxide particles, thereby reducing the internal resistance of the particles. Further, expansion and contraction of the lithium-transition metal composite oxide particle crystal with charge-discharge become small, and contact with a conductive agent improves, thereby preventing destruction of the crystal itself of the lithium-transition metal composite oxide particles. A (400) crystallinity of 720 Å or more does not promote the destruction of the crystal of the lithium-transition metal composite oxide particles even after multiple charge-discharge cycles, thereby providing excellent cycle characteristics.

The (400) crystallinity is an index representing a degree of regularity of a unit lattice arrangement and can be applied to a lithium-transition metal composite oxide of a spinel structure as employed in the present invention. The larger the (400) crystallinity is, the better the crystallinity and the less the distortion of the crystal structure are.

The (400) crystallinity of the lithium-transition metal composite oxide can be determined through an X-ray diffraction analysis, for example. The X-ray diffraction analysis can be performed under the conditions of, for example, a tube current of 100 mA and a tube voltage of 40 kV. The crystallinity can be calculated from diffraction peaks ascribable to a (400) plane obtained by the X-ray diffraction analysis using the Scherrer equation represented by the following equation (1).

$$D=K\lambda/(\beta \cos \theta) \quad (1)$$

In the equation, D represents a (400) crystallinity (Å), K represents the Scherrer constant (a value providing a diffraction peak of 1,000 Å ascribable to the (400) plane obtained using sintered Si for optical system alignment (available from Rigaku Corporation)), and $\lambda$ represents a wavelength of an X-ray source (1.540562 Å for CuKα1). $\beta$ is calculated by $\beta=By$ (B represents a width of an observation profile; and y is calculated by $y=0.9991-0.019505b-2.8205b^2+2.878b^3-1.0366b^4$; here, b represents a width of a device constant profile), and $\theta$ represents a diffraction angle (degree).

According to the third aspect of the present invention, the lithium-transition metal composite oxide as particles preferably has a (400) crystallinity of 700 to 980 Å. A (400) crystallinity within the above range provides better cycle characteristics and high rate characteristics.

<Production Method for Positive Electrode Active Material for Nonaqueous Electrolyte Secondary Battery>

Production method for the positive electrode active material of the present invention is not particularly limited. The positive electrode active material can be produced through the following (1) and (2), for example.

(1) Preparation of a Starting Material Mixture

Compounds described below are mixed such that each constituent element exists in a predetermined compositional ratio, to thereby obtain a starting material mixture. The compounds used for preparing the starting material mixture are selected depending on the elements that constitute the target composition.

A mixing method is not particularly limited, and examples thereof include: a method in which the compounds are mixed using water and/or an organic solvent to form a slurry, and then dried to obtain a starting material mixture; a method in which aqueous solutions of the above-mentioned compounds are mixed to form a precipitate, which then is dried to obtain a starting material mixture; and a method using those methods in combination.

Of those, the method in which aqueous solutions of the above-mentioned compounds are mixed to form a precipitate, which then is dried to obtain a starting material mixture is preferable.

Hereinafter, compounds that can be used for preparing a starting material mixture will be exemplified.

The lithium compound is not particularly limited, and examples thereof include lithium carbonate, lithium hydroxide, lithium fluoride, lithium chloride, lithium nitrate, lithium sulfate, lithium hydrogen carbonate, lithium acetate, lithium bromide, lithium iodide, lithium oxide, and lithium peroxide. Of those, $Li_2CO_3$, LiOH, $LiOH.H_2O$, $Li_2O$, LiCl, $LiNO_3$, $Li_2SO_4$, $LiHCO_3$, and $Li(CH_3COO)$ are preferable.

The manganese compound is not particularly limited, and examples thereof include manganese metal, manganese oxide ($MnO_2$, $Mn_2O_3$, and $Mn_3O_4$, for example), manganese hydroxide, manganese carbonate, manganese chloride, manganese iodide, manganese sulfate, and manganese nitrate. Of those, manganese metal, $MnCO_3$, $MnSO_4$ and $MnCl_2$ are preferable.

It is preferable to use the manganese compound with d10 in a range of between 5 and 20 μm, d50 of between 7 and 40 μm, and d90 of between 10 and 60 μm in the particle size distribution, where the d10, d50 and d90 represent the particle diameters reaching the volume cumulative frequencies of 10%, 50% and 90%, respectively. In order to obtain a manganese compound in such the particle size distribution, a mortar, a ball mill, a vibration mill, a pin mill, a jet mill, or the like may be used. In addition, various types of classifiers may be used.

The magnesium compound is not particularly limited, and examples thereof include MgO, $MgCO_3$, $Mg(OH)_2$, $MgCl_2$, $MgSO_4$, $Mg(NO_3)_2$, $Mg(CH_3COO)_2$, magnesium iodide, and magnesium perchlorate. Of those, $MgSO_4$ and $Mg(NO_3)_2$ are preferable.

The boron compound is not particularly limited, and examples thereof include lithium boron composite oxide, orthoboric acid, boron oxides, and boron phosphates. Of those, $B_2O_3$ and $H_3BO_3$ are preferable.

The fluorine compound is not particularly limited, and examples thereof include $NH_4F$, LiF, $MnF_2$, hydrogen fluoride, hydrofluoric acid, chloride oxyfluoride, and bromine fluorosulfate. Of those, $NH_4F$, LiF and $MnF_2$ are preferable.

The titanium compound is not particularly limited, and examples thereof include titanium fluoride, titanium chloride, titanium bromide, titanium iodide, titanium oxide, titanium sulfide, titanium sulfate and the like. Of those, TiO, $TiO_2$, $Ti_2O_3$, $TiCl_2$, and $Ti(SO_4)_2$ are preferable.

The cerium compound is not particularly limited, and examples thereof include cerium fluoride, cerium chloride, cerium bromide, cerium iodide, cerium oxide, cerium sulfide, and cerium carbonate. Of thoses, $CeF_2$, $CeCl_2$, $CeBr_2$, $CeI_2$, CeO, $CeO_2$, and $CeS_2$ are preferable.

The zirconium compound is not particularly limited, and examples thereof include zirconium fluoride, zirconium chloride, zirconium bromide, zirconium iodide, zirconium oxide, zirconium sulfide, zirconium carbonate, zirconium sulfate, zirconium nitrate, zirconium acetate, zirconium oxychloride and the like. Of those, $ZrF_2$, ZrCl, $ZrCl_2$, $ZrBr_2$, $ZrI_2$, ZrO, $ZrO_2$, $ZrS_2$, $Zr(OH)_3$, $Zr(SO_4)_2$, and $ZrOCl_2$ are preferable.

The hafnium compound is not particularly limited, and examples thereof include hafnium fluoride, hafnium chloride, hafnium bromide, hafnium iodide, hafnium oxide, and hafnium carbonate. Of those, $HfF_4$, $HfCl_2$, $HfBr_2$, $HfO_2$, $Hf(OH)_4$, and $Hf_2S$ are preferable.

The sulfur compound is not particularly limited, and examples thereof include sulfides, sulfur iodide, hydrogen sulfide, sulfuric acid and salts thereof, and nitrogen sulfide. Of those, $Li_2SO_4$, $MnSO_4$, $(NH_4)_2SO_4$, $Al_2(SO_4)_3$, and $MgSO_4$ are preferable.

The sodium compound is not particularly limited, and examples thereof include $Na_2CO_3$, NaOH, $Na_2O$, NaCl, $NaNO_3$, $Na_2SO_4$, $NaHCO_3$, and $CH_3COONa$.

The calcium compound is not particularly limited, and examples thereof include CaO, $CaCO_3$, $Ca(OH)_2$, $CaCl_2$, $CaSO_4$, $Ca(NO_3)_2$, and $Ca(CH_3COO)_2$.

Further, a compound which may also be used contains two or more of the respective above-mentioned elements.

Hereinafter, a preferable method of obtaining a starting material mixture will be described in detail by way of examples of a positive electrode active material composed of the lithium manganese composite oxide containing magnesium, boron, and fluorine as the lithium-transition metal composite oxide.

An aqueous solution containing manganese ions and magnesium ions of predetermined compositional ratios, which is prepared using the above-mentioned manganese compounds and magnesium compounds, is added dropwise to stirred purified water.

Then, an aqueous solution of ammonium hydrogen carbonate is added dropwise, and manganese and magnesium are precipitated, to thereby obtain salt of manganese and magnesium. Note that an alkali solution such as an aqueous solution of sodium hydroxide, an aqueous solution of sodium hydrogen carbonate, an aqueous solution of potassium hydroxide, and an aqueous solution of lithium hydroxide can be used in place of the aqueous solution of ammonium hydrogen carbonate.

Next, the aqueous solution is filtered to collect the precipitate, and the collected precipitate is washed with water and heat-treated. Thereafter, the precipitate is mixed with the above-mentioned lithium compounds, boron compounds and fluorine compounds to thereby obtain the starting material mixture.

Note if titanium compounds are used in place of the fluorine compounds in the above-mentioned method, the starting material mixture to be used for a positive electrode active material composed of the lithium manganese composite oxide containing magnesium, boron and titanium can be obtained. Further, if zirconium compounds are used in place of the fluorine compounds in the above-mentioned method, the starting material mixture to be used for a positive electrode active material composed of the lithium manganese composite oxide containing magnesium, boron and zirconium can be obtained.

(2) Calcination of the Starting Material Mixture and Pulverization of its Sinter Then, the starting material mixture is calcined. The temperature, time, atmosphere of calcination, and the like are not particularly limited and may be determined appropriately depending on the purpose.

The calcination temperature is preferably 650° C. or higher, and more preferably 700° C. or higher. The calcination temperature within the above range provides sufficient characteristics as the positive electrode active material without unreacted starting material remaining in the resulting positive electrode active material.

The calcination temperature is preferably 1100° C. or lower, more preferably 950° C. or lower. The calcination temperature within the above range inhibits production of byproducts which may become a cause of problems such as a reduction of discharge capacity per unit weight, deterioration in cycle characteristics, and a decrease in operating voltage.

The calcination time is preferably 1 hour or more, more preferably 6 hours or more. If the calcination time is within the above range, a dispersion reaction among the mixture particles proceeds sufficiently.

The calcination time is preferably 24 hours or less, more preferably 12 hours or less. If the calcination time is within the above range, synthesis proceeds sufficiently.

The calcinations may be performed in a plurality of steps. For example, the first calcination step is made at the temperature of 350 to 550° C. for 1 to 24 hours, and the second calcination step is made at the temperature of 650 to 1000° C. for 1 to 24 hours.

Examples of the calcination atmosphere include atmospheric gas, oxygen gas, and mixed gases composed of one or more of these gases and an inert gas such as nitrogen gas or argon gas, an atmosphere in which oxygen concentration (oxygen partial pressure) is controlled, and a weakly oxidizing atmosphere. Of those, the atmosphere in which oxygen concentration is controlled is preferable.

After the calcination, the product may be optionally pulverized by use of a mortar, a ball mill, a vibration mill, a pin mill, a jet mill, or the like to pulverize the product into a predetermined specific surface area and particle size distribution.

Through the above-mentioned production method, the positive electrode active material of the present invention can be obtained. The positive electrode active material of the present invention may be suitably employed in a positive electrode mixture and a nonaqueous electrolyte secondary battery of the present invention described below.

<Positive Electrode Mixture for Nonaqueous Electrolyte Secondary Battery>

Next, the positive electrode mixture of the present invention will be described.

The positive electrode mixture of the present invention is a positive electrode mixture containing the positive electrode active material according to the first embodiment of the present invention and a conductive agent. Further, the positive electrode mixture contains at least one element which may become tetravalent between the active material for a nonaqueous electrolyte secondary battery and the conductive agent.

According to the positive electrode mixture of the present invention, "between" refers to a position between the lithium-transition metal composite oxide and the conductive agent in contact therewith. As specifically shown in FIG. 7, an element 54 which may become tetravalent exists between a lithium-transition metal composite oxide of a positive electrode active material 52 and a conductive agent 53 in contact therewith. Many three-phase interfaces 51 exist in the positive electrode mixture of the present invention as described above, to thereby provide excellent cycle characteristics and high rate characteristics.

Further, the inclusion of the element which may become tetravalent between the lithium-transition metal composite oxide and the conductive agent inhibits separation of the lithium-transition metal composite oxide and the conductive agent, thereby improving coating characteristics to a collector of the positive electrode mixture.

According to the positive electrode mixture of the present invention, the conductive agent is not particularly limited. Examples thereof include carbon materials such as black lead, e.g., natural black lead, artificial black lead, carbon black, e.g., acetylene black, and amorphous carbon, e.g., needle coke.

Acetylene black and/or artificial black lead is preferable for excellent conductivity, thereby further improving the cycle characteristics and the high rate characteristics.

According to the present invention, the positive electrode mixture not only refers to a paste composed of the positive electrode active material, the conductive agent, a binder, and a solvent of the binder, but also includes a state of the positive electrode active material which is coated on the positive electrode current collector and dried by evaporating the solvent of the binder.

According to the positive electrode mixture of the present invention, an existing form of the element which may become tetravalent is not particularly limited. The element which may become tetravalent may exist in a form of a compound.

According to the positive electrode mixture of the present invention, examples of the element which may become tetravalent include titanium, zirconium, hafnium, and cerium. Of those, zirconium and/or cerium are preferable. Zirconium and/or cerium may supposedly catalyze the lithium-transition metal composite oxide, to thereby improve the cycle characteristics and high rate characteristics.

The production method for the positive electrode mixture of the present invention is not particularly limited. The positive electrode mixture can be produced by mixing a carbon-based conductive agent such as acetylene black and black lead, a binder, a solvent or a dispersant of the binder with powder of the positive electrode active material of the present invention, for example.

<Nonaqueous Electrolyte Secondary Battery>

The positive electrode active material and the positive electrode mixture of the present invention may be suitably employed in a nonaqueous electrolyte secondary battery such as a lithium ion secondary battery and a lithium ion polymer secondary battery.

That is, a nonaqueous electrolyte secondary battery of the present invention is a nonaqueous electrolyte secondary battery employing the above-mentioned positive electrode active material of the present invention.

The nonaqueous electrolyte secondary battery of the present invention may just employ the positive electrode active material of the present invention as at least a part of the positive electrode active material used in a conventional nonaqueous electrolyte secondary battery, and other construction is not particularly limited. An electrolytic solution is employed for the lithium ion secondary battery, and a solid electrolyte (polymer electrolyte) is employed for the lithium ion polymer secondary battery, for example. The solid electrolytes described below may be used for the lithium ion polymer secondary battery.

Hereinafter, the lithium ion secondary battery will be described as an example.

At least one selected from the group consisting of a carbon material capable of intercalating and deintercalating lithium metal, lithium alloys, or lithium ions and a compound capable of intercalating and deintercalating lithium ions can be used as a negative electrode active material. Examples of the lithium alloys include an LiAl alloy, an LiSn alloy, and an LiPb alloy. Examples of the carbon material capable of intercalating and deintercalating lithium ions include graphite and black lead. Examples of the compound capable of intercalating and deintercalating lithium ions include oxides such as tin oxide and titanium oxide.

The electrolyte is not particularly limited as long as the electrolyte is a compound that is not denatured or decomposed at an operating voltage. The electrolyte includes an electrolytic solution.

Examples of the solvent used for the electrolytic solution include organic solvents such as dimethoxyethane, diethoxyethane, ethylene carbonate, propylene carbonate, dimethyl carbonate, diethyl carbonate, ethyl methyl carbonate, methyl formate, γ-butyrolactone, 2-methyltetrahydrofuran, dimethyl sulfoxide, and sulfolane. These solvents may be used singly or two or more kinds thereof may be used in combination.

Examples of the electrolyte used as the electrolytic solution include lithium salts such as lithium perchlorate, lithium tetrafluoroborate, lithium hexafluorophosphate, and lithium trifluoromethanoate.

The above-mentioned solvent and electrolyte are mixed to prepare an electrolytic solution. Here, a gelling agent or the like may be added to the electrolytic solution in order to use the solution in a form of gel. Alternatively, the electrolytic solution may be used by being absorbed by a hygroscopic polymer.

Further, inorganic or organic solid electrolytes having conductivity of lithium ions may also be used.

Examples of a separator include porous films made of polyethylene, polypropylene, or the like.

Examples of the binder include polyvinylidene fluoride, polytetrafluoroethylene, polyamide, and an acrylic resin.

The positive electrode active material of the present invention as well as the above-mentioned negative electrode active material, the electrolytic solution, the separator, and the binder can be used to produce a nonaqueous electrolyte secondary battery of the present invention according to a conventional method.

Lithium cobaltate and/or lithium nickelate can be used along with the positive electrode active material of the present invention as the positive electrode active material, to thereby provide a nonaqueous electrolyte secondary battery having high charge-discharge capacity and having excellent cycle characteristics, high rate characteristics, and power characteristics.

A preferable lithium cobaltate is represented by the general formula $Li_{1+x}CoO_2$ (where, $-0.5 \leq x \leq 0.5$). A part of the lithium cobaltate may be substituted with at least one element selected from the group consisting of magnesium, aluminum, calcium, vanadium, titanium, chromium, manganese, iron, cobalt, nickel, copper, zinc, strontium, zirconium, niobium, molybdenum, and tin.

A preferable lithium nickelate is represented by the general formula $Li_{1+x}NiO_2$ (where, $-0.5 \leq x \leq 0.5$). A part of the lithium nickelate may be substituted with at least one element selected from the group consisting of magnesium, aluminum, calcium, vanadium, titanium, chromium, manganese, iron, cobalt, nickel, copper, zinc, strontium, zirconium, niobium, molybdenum, and tin.

The lithium cobaltate and/or lithium nickelate used along with the positive electrode active material of the present invention is a positive electrode active material for a nonaqueous electrolyte secondary battery containing at least a lithium-transition metal composite oxide. Preferable aspects of the lithium-transition metal composite oxide include the following (i) to (iii).

(i) An aspect in which the lithium-transition metal composite oxide is represented by the general formula $Li_vCo_{1-x}M^1_wM^2_xO_yS_z$ (where, $M^1$ represents Al or Ti; $M^2$ represents Mg and/or Ba; $0.95 \leq v \leq 1.05$; w equals to 0, or $0 \leq w \leq 0.10$ when $M^1$ is Al and $0 \leq w \leq 0.05$ when $M^1$ is Ti; $0 \leq x \leq 0.10$; $1 \leq y \leq 2.5$; and $0 \leq z \leq 0.015$).

The combination of a positive electrode active material containing the lithium-transition metal composite oxide and the positive electrode active material of the present invention can provide a battery with not only excellent high-temperature cycle characteristics, high rate characteristics, and cycle characteristics, but also high capacity and safety.

(ii) An aspect in which the lithium-transition metal composite oxide is represented by the general formula $Li_aCO_{1-b}M_bO_cX_dS_e$ (where, M represents at least one element selected from the group consisting of Ti, Al, V, Zr, Mg, Ca, and Sr; X represents at least one of the halogen elements; $0.95 \leq a \leq 1.05$; $0 \leq b \leq 0.10$; $1 \leq c \leq 2.5$; $0 \leq d \leq 0.1$; and $0 \leq e \leq 0.015$).

The combination of a positive electrode active material containing the lithium-transition metal composite oxide and the positive electrode active material of the present invention can provide a battery with not only excellent high-temperature cycle characteristics, high rate characteristics, and cycle characteristics, but also high capacity and safety.

(iii) An aspect in which the lithium-transition metal composite oxide is at least one selected from the group consisting of lithium cobaltate, lithium nickel cobaltate, lithium nickel cobalt aluminate, and lithium nickel cobalt manganate. The lithium-transition metal composite oxide of the aspect (iii) is in a form of particles and has an existence ratio of zirconium on the particle surface of 20% or more.

The combination of a positive electrode active material containing the lithium-transition metal composite oxide and the positive electrode active material of the present invention can provide a battery with not only excellent high-temperature cycle characteristics, high rate characteristics, and cycle characteristics, but also high capacity and safety.

The positive electrode active material used along with the positive electrode active material of the present invention preferably has an existence ratio of zirconium on the particle surface of 20% or more. The details will be described below.

According to the present invention, "existence ratio of zirconium on surface of lithium-transition metal composite oxide particles" can be determined by the following.

First, a group of particles of a lithium-transition metal composite oxide is observed for an existence state of zirconium on the particle surface using an electron probe microanalyzer (EPMA) equipped with a wavelength dispersive X-ray photospectrometer (WDX). Then, a part at which the amount of zirconium per unit area is the largest (part with the highest zirconium peak) in a visual field of the observation is selected, and line analysis is performed along a line segment (line segment having a length of 300 μm, for example) passing through this part. In the line analysis, the peak value of the above-mentioned part at which the amount of zirconium per unit area is largest is defined as 100%. The sum of lengths of parts having peak values of 4% or more is divided by the length of the line segment. The quotient is defined as an "existence ratio of zirconium on surface of lithium-transition metal composite oxide particles". Note that the average value of the "existence ratio of zirconium on surface of lithium-transition metal composite oxide particles" is preferably determined by repeating the line analysis for a plurality of times (10 times, for example).

In the above-mentioned method, parts at which the peak value of zirconium is less than 4% are regarded as parts at which zirconium is not present because of a large difference with the part at which the amount of zirconium per unit area is largest.

The above-mentioned "existence ratio of zirconium on surface of lithium-transition metal composite oxide particles" can express whether zirconium exists uniformly or exists unevenly on the surface of the lithium-transition metal composite oxide particles.

A preferable method of producing a positive electrode using the positive electrode active material of the present invention will be described hereinbelow.

Powder of the positive electrode active material of the present invention is mixed with a carbon-based conductive agent such as acetylene black or black lead, a binder, and a solvent or a dispersant of the binder, to thereby prepare a positive electrode mixture. The obtained positive electrode mixture is made into a slurry or a kneaded product and coated or carried on a current collector such as an aluminum foil, followed by press-rolling to form a layer of the positive electrode active material on the current collector.

Figure 3:
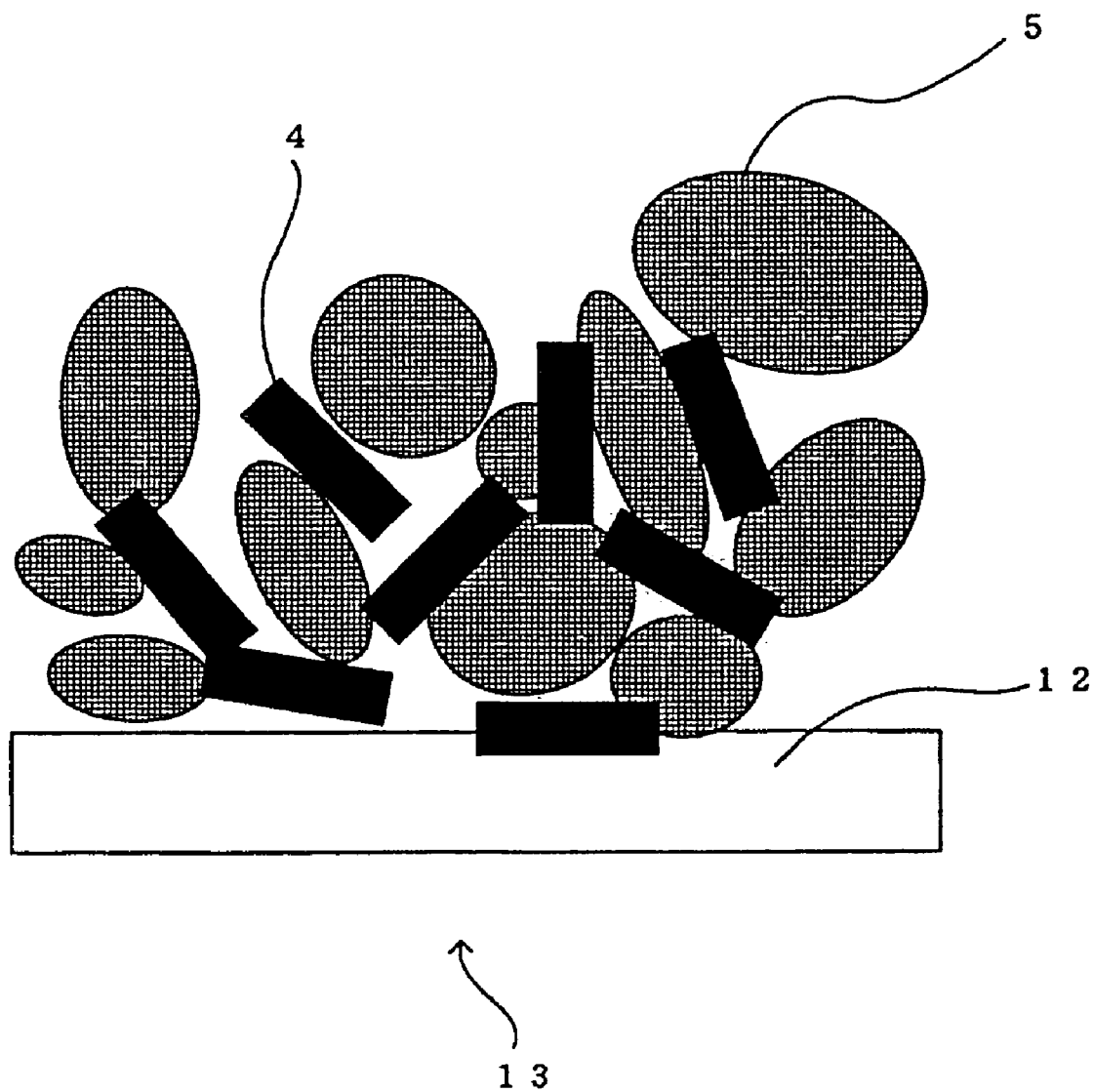
FIG. 3 is a schematic sectional view showing a positive electrode.

FIG. 3 is a schematic sectional view showing a positive electrode. FIG. 3 shows that a positive electrode 13 includes a positive electrode active material 5 held on a current collector 12 through a binder 4.

Assumedly, the positive electrode active material of the present invention has excellent miscibility with conductive agent powder, resulting in a low internal resistance of the battery. Therefore, the battery has excellent charge-discharge characteristics, in particular, excellent high rate characteristics.

Further, the positive electrode active material of the present invention has excellent flowability even when the material is kneaded with a binder, and is easily entangled with a polymer in the binder, thereby exhibiting excellent bindability.

<Nonaqueous Electrolyte Secondary Battery>

A preferable embodiment of the nonaqueous electrolyte secondary battery of the present invention includes: a strip positive electrode constituted by forming, on at least one side (that is, may be one side or both sides) of a strip positive electrode current collector, a positive electrode active material layer employing the positive electrode active material of the present invention; a strip negative electrode constituted by forming, on at least one side of a strip negative electrode current collector, a negative electrode active material layer employing, as a negative electrode active material, one of a carbon material capable of intercalating and deintercalating lithium metal, lithium alloys, or lithium ions and a compound capable of intercalating and deintercalating lithium ions; and a strip separator, in which: the strip positive electrode and the strip negative electrode laminated with the strip separator between them are wound plural times to form a web of the strip positive electrode and the strip negative electrode with the strip separator intervening between them.

Such a nonaqueous electrolyte secondary battery involves simple production steps and suppresses forming of cracks in the positive electrode active material layer and the negative electrode active material layer and peeling thereof from the strip separator. Further, the nonaqueous electrolyte secondary battery has a large battery capacity and a high energy density. The positive electrode active material according to the second and third embodiments of the present invention, in particular, has excellent filling ability and easily conforms to the binder. Therefore, the positive electrode active material provides a positive electrode with high charge-discharge capacity, excellent bindability, and excellent surface smoothness, capable of preventing cracks or peeling of the positive electrode active material layer.

Further, a nonaqueous electrolyte secondary battery having even higher charge-discharge capacity without deteriorating the battery characteristics of the present invention can be provided by forming the positive electrode active material layer employing the positive electrode active material of the present invention on both sides of the strip positive electrode current collector and by forming the negative electrode active material layer employing the negative electrode active material on both sides of the strip negative electrode current collector.

Further, another preferable embodiment of the nonaqueous electrolyte secondary battery of the present invention includes a positive electrode, a negative electrode, a separator, and a nonaqueous electrolyte in which the following I is used as a positive electrode active material of the positive electrode and the following II is used as a negative electrode active material of the negative electrode.

I: Positive electrode active material for a nonaqueous electrolyte secondary battery prepared by mixing a lithium-transition metal composite oxide to be used in the positive electrode active material for a nonaqueous electrolyte secondary battery of the present invention and lithium cobaltate represented by the general formula $Li_{1+x}CoO_2$ (where, $-0.5 \leq x \leq 0.5$) and/or a lithium niccolate represented by the general formula $Li_{1+x}NiO_2$ (where, $-0.5 \leq x \leq 0.5$) at a predetermined rate to be fallen within the range of $0.2 \leq B/(A+B) \leq 0.8$ (where, A represents weight of the lithium-transition metal composite oxide and B represents weight of the lithium cobaltate and/or lithium niccolate).

II: Negative electrode active material for nonaqueous electrolyte secondary battery composed of at least one selected from the group consisting of a lithium metal, a lithium alloy, a carbon material capable of intercalating and deintercalating lithium ions or a compound capable of intercalating and deintercalating the lithium ions.

Such nonaqueous electrolyte secondary battery has a high polar plate density and exhibits not only excellent cycle characteristics and high-temperature characteristics but also excellent high rate characteristics and power characteristics.

The above positive electrode active material is preferably mixed within the range of $0.4 \leq B/(A+B) \leq 0.6$. The positive electrode active material mixed within the range of $0.4 \leq B/(A+B) \leq 0.6$ provides a nonaqueous electrolyte secondary battery with not only improved electrode plate density, preventiveness of dryout, and overcharge characteristics, but also significantly improved cycle charge-discharge characteristics, high rate characteristics and power characteristics.

The compound capable of intercalating and deintercalating lithium ions is preferably a negative electrode active material for a nonaqueous electrolyte secondary battery represented by the general formula $Li_aTi_bO_{4+c}$ (where, $0.8 \leq a \leq 1.5$, $1.5 \leq b \leq 2.2$, and $-0.5 \leq c \leq 0.5$), which has a spinel structure containing an alkali metal and/or an alkali earth metal. Here, a nonaqueous electrolyte secondary battery can be provided with extremely improved cycle characteristics.

A shape of the nonaqueous electrolyte secondary battery of the present invention is not particularly limited and may be in a form of a cylinder, a coin, a square, a laminate, or the like.

Figure 4:
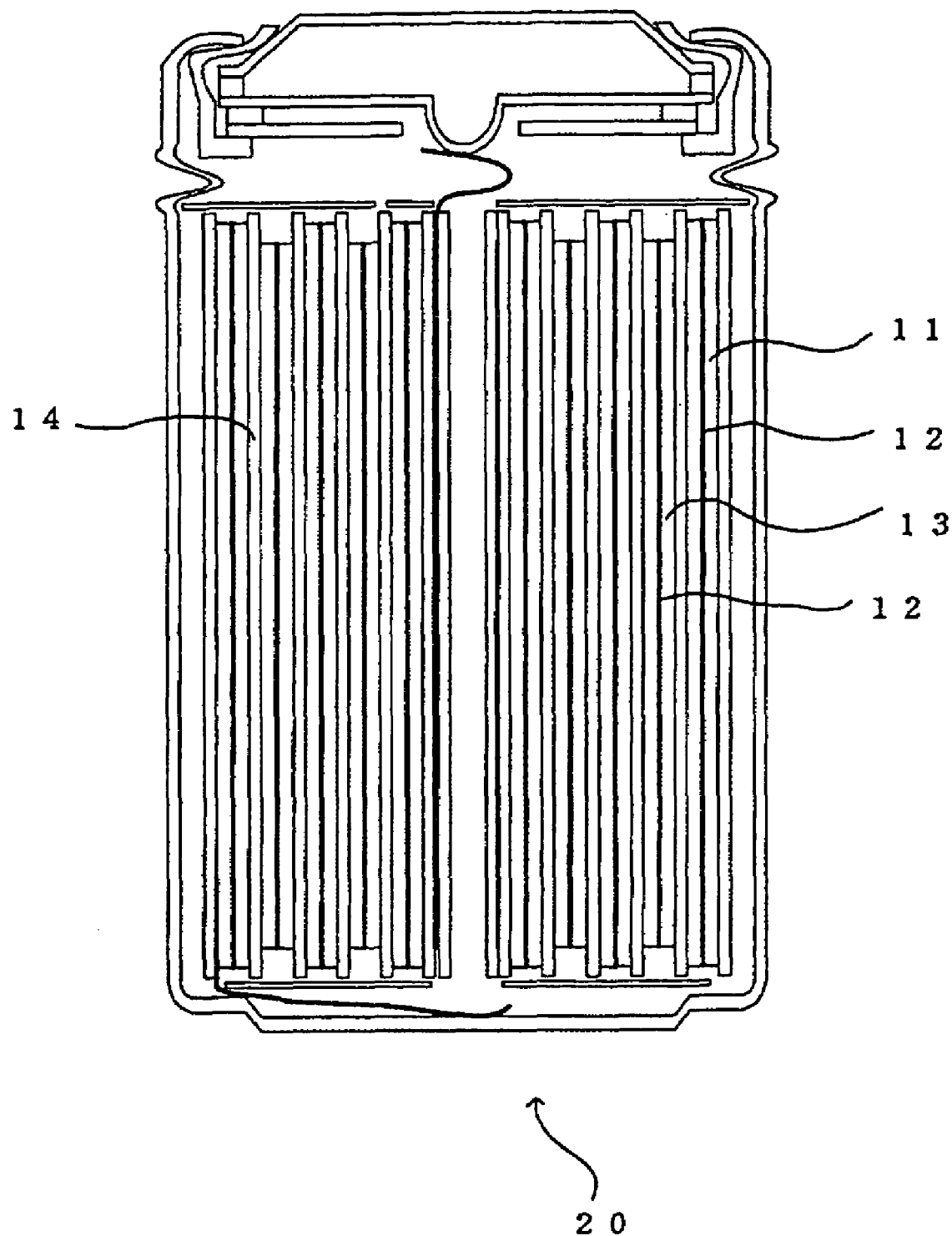
FIG. 4 is a schematic sectional view showing a cylinder type battery.

FIG. 4 is a schematic sectional view showing a cylinder type battery. FIG. 4 shows in a cylinder type battery 20, positive electrodes 13, made up of layers of a positive electrode active material formed on current collectors 12, and negative electrodes 11, made up of layers of a negative electrode active material formed on current collectors 12, alternately laminated on one another with separators 14 intervening between them.

Figure 5:
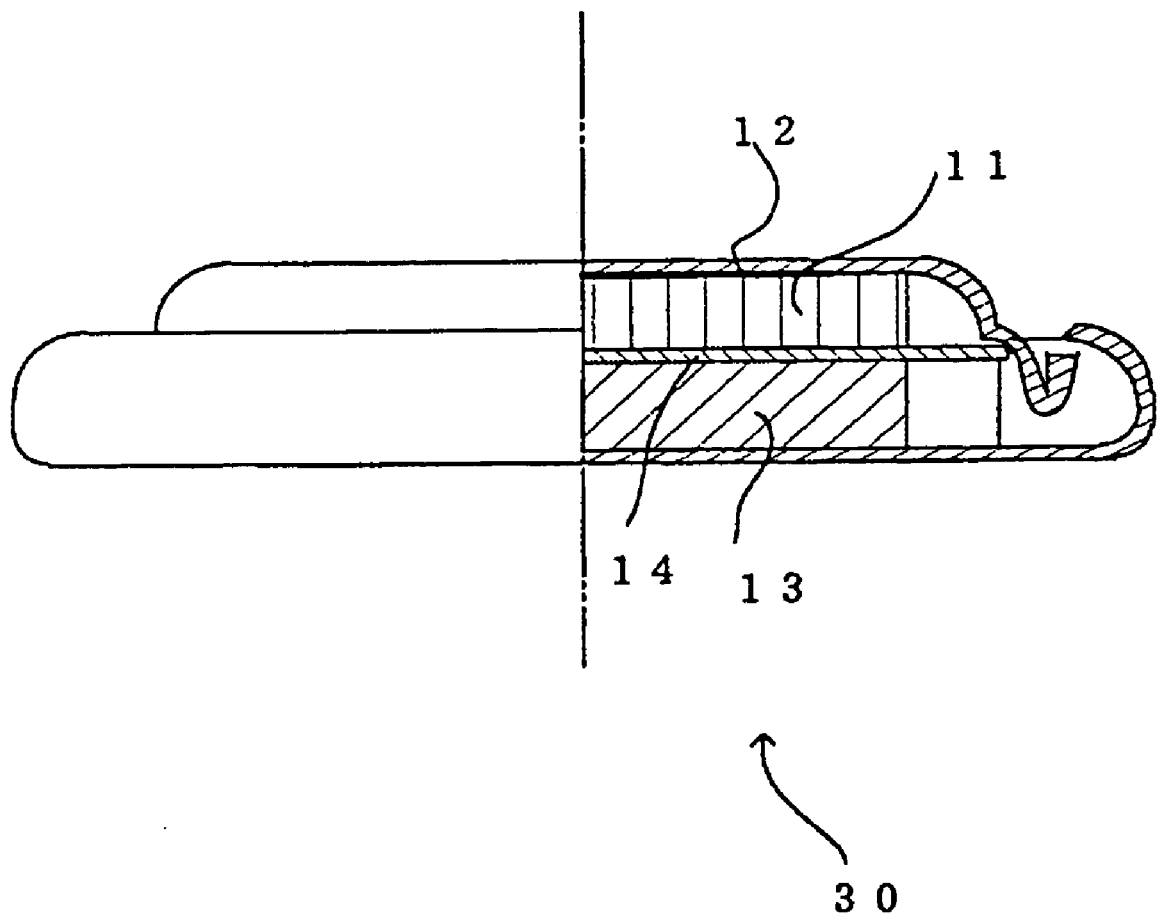
FIG. 5 is a schematic fragmentary sectional view showing a coin type battery.

FIG. 5 is a schematic fragmentary sectional view showing a coin type battery. FIG. 5 shows in a coin type battery 30, a positive electrode 13, made up of a layer of a positive electrode active material formed on current collectors 12, and a negative electrode 11 laminated through a separator 14.

Figure 6:
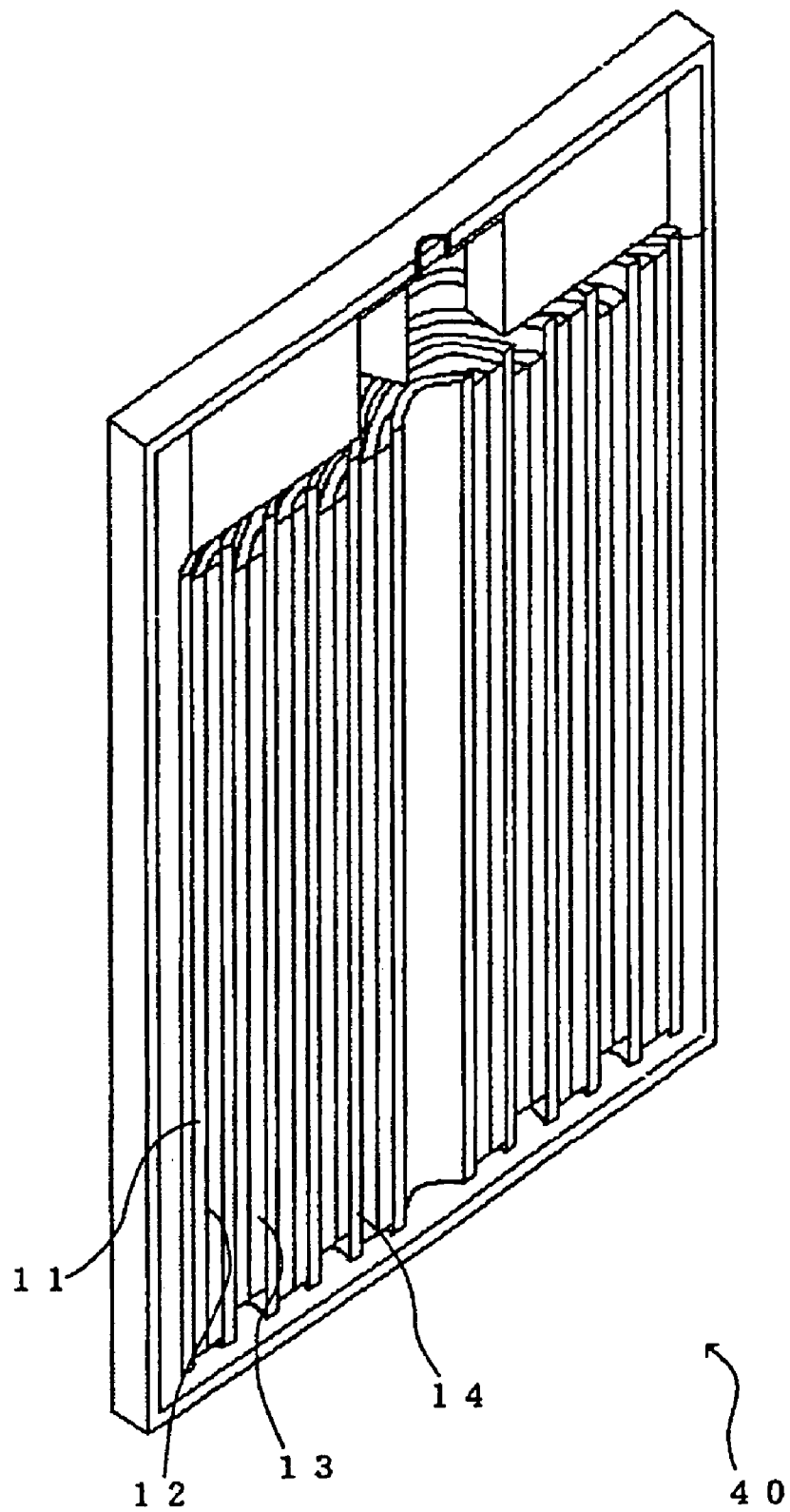
FIG. 6 is a schematic perspective view showing a square type battery.

FIG. 6 is a schematic perspective view showing a square type battery. FIG. 6 shows in a square type battery 40, positive electrodes 13, made up of layers of a positive electrode active material formed on current collectors 12, and negative electrodes 11 made up of layers of a negative electrode active material formed on current collectors 12 alternately laminated on one another with separators 14 intervening between them.

<Applications of Nonaqueous Electrolyte Secondary Battery>

Applications of the nonaqueous electrolyte secondary battery that employs the positive electrode active material of the present invention are not particularly limited. Examples of the applications include power supplies for equipment such as laptop personal computers, pen-input personal computers, pocket personal computers, laptop word processors, pocket word processors, electronic book players, cellular phones, cordless phone, electronic notebooks, calculators, liquid crystal televisions, electric shavers, electrically powered tools, electronic translation machines, automobile telephones, mobile printers, transceivers, pagers, handy terminals, mobile copiers, audio input equipment, memory cards, backup power supplies, tape recorders, radios, headphone stereos, handy cleaners, portable compact disk (CD) players, video movies, and navigation systems.

Further examples of the applications of the battery include power supplies for illuminating equipment, air-conditioners, televisions, stereos, water heaters, refrigerators, microwave ovens, dish washers, washing machines, driers, game equipment, toys, load conditioners, medical equipment, automobiles, electric automobiles, golf carts, electrically powered carts, and electrical power storage systems.

Further, the applications of the battery are not limited to social applications and may be used for military or in space applications.

EXAMPLES

Hereinafter, the present invention will be described in more detail by way of examples. However, the present invention is not limited thereto.

1. Preparation of Positive Electrode Active Material

Example 1-1

Carbonate of manganese and magnesium was washed with water, dried, and then mixed with orthoboric acid, zirconium oxide, and lithium carbonate. At that time, zirconium oxide was mixed so that zirconium accounted for 0.5 mol % with respect to a lithium manganese composite oxide. The obtained mixture was calcined at about 800° C. for about 10 hours. The resultant product was pulverized, to thereby obtain a positive electrode active material.

A compositional ratio of the obtained positive electrode active material was $Li_{1.02}Mn_{1.95}Mg_{0.05}Zr_{0.005}B_{0.005}O_4$.

Example 1-2

Carbonate of manganese and magnesium was washed with water, dried, and then mixed with orthoboric acid, cerium oxide, and lithium carbonate. At that time, cerium oxide was mixed so that cerium accounted for 0.3 mol % with respect to a lithium manganese composite oxide. The obtained mixture was calcined at about 800° C. for about 10 hours. The resultant product was pulverized, to thereby obtain a positive electrode active material.

A compositional ratio of the obtained positive electrode active material was $Li_{1.04}Mn_{1.93}Mg_{0.05}Ce_{0.003}B_{0.005}O_4$.

Example 3-1

Carbonate of manganese and magnesium was washed with water, dried, and then mixed with orthoboric acid and lithium carbonate. The obtained mixture was calcined at about 800° C. for about 10 hours. The resultant product was pulverized, to thereby obtain a positive electrode active material.

A compositional ratio of the obtained positive electrode active material was $Li_{1.04}Mn_{1.93}Mg_{0.05}B_{0.005}O_4$.

Example 2-1

Carbonate of manganese and magnesium was washed with water, dried, and then mixed with orthoboric acid and lithium carbonate. The obtained mixture was calcined at about 500° C. for about 2 hours. The obtained calcined product was mixed with lithium fluoride, and the obtained mixture was calcined at about 800° C. for about 10 hours. The resultant product was pulverized, to thereby obtain a positive electrode active material.

A compositional ratio of the obtained positive electrode active material was $Li_{1.04}Mn_{1.93}Mg_{0.05}B_{0.005}F_{0.01}O_4$.

Example 3-2

Carbonate of manganese and magnesium was washed with water, dried, and then mixed with orthoboric acid and lithium carbonate. The obtained mixture was calcined at about 500° C. for about 2 hours. The obtained calcined product was further calcined at about 800° C. for about 10 hours. The resultant calcined product was pulverized, to thereby obtain a positive electrode active material.

A compositional ratio of the obtained positive electrode active material was $Li_{1.05}Mn_{1.92}Mg_{0.05}B_{0.005}O_4$.

Example 3-3

Carbonate of manganese and magnesium was washed with water, dried, and then mixed with orthoboric acid and lithium carbonate. The obtained mixture was calcined at about 800° C. for about 10 hours. The resultant calcined product was pulverized, to thereby obtain a positive electrode active material.

A compositional ratio of the obtained positive electrode active material was $Li_{1.05}Mn_{1.92}Mg_{0.05}B_{0.005}O_4$.

Example 3-4

A positive electrode active material was obtained in the same manner as in Example 3-3 except that carbonate of manganese and magnesium was washed with water, dried, and then mixed with orthoboric acid and lithium carbonate to result in a predetermined compositional ratio.

A compositional ratio of the obtained positive electrode active material was $Li_{1.03}Mn_{1.87}Mg_{0.12}B_{0.005}O_4$.

Example 3-5

Carbonate of manganese and magnesium was washed with water, dried, and then mixed with orthoboric acid, titanium oxide, and lithium carbonate. At that time, titanium oxide was mixed so that titanium accounted for 1.0 mol % with respect to a lithium manganese composite oxide. The obtained mixture was calcined at about 800° C. for about 10 hours. The resultant product was pulverized, to thereby obtain a positive electrode active material.

A compositional ratio of the obtained positive electrode active material was $Li_{1.04}Mn_{1.92}Mg_{0.05}Ti_{0.01}B_{0.005}O_4$.

Example 3-6

Carbonate of manganese and magnesium was washed with water, dried, and then mixed with orthoboric acid, titanium oxide, and lithium carbonate. At that time, titanium oxide was mixed so that titanium accounted for 5.0 mol % with respect to a lithium manganese composite oxide. The obtained mixture was calcined at about 800° C. for about 10 hours. The resultant product was pulverized, to thereby obtain a positive electrode active material.

A compositional ratio of the obtained positive electrode active material was $Li_{1.03}Mn_{1.89}Mg_{0.05}Ti_{0.05}B_{0.005}O_4$.

Comparative Example 1

Manganese carbonate was washed with water, dried, and then mixed with lithium carbonate. The obtained mixture was calcined at about 800° C. for about 10 hours. The resultant product was pulverized, to thereby obtain a positive electrode active material.

A compositional ratio of the obtained positive electrode active material was $Li_{1.08}Mn_{1.94}O_4$.

Comparative Example 2

Carbonate of manganese and magnesium was washed with water, dried, and then mixed with lithium carbonate. The obtained mixture was calcined at about 800° C. for about 10 hours. The resultant product was pulverized, to thereby obtain a positive electrode active material.

A compositional ratio of the obtained positive electrode active material was $Li_{1.05}Mn_{1.92}Mg_{0.05}O_4$.

Comparative Example 3

Carbonate of manganese and magnesium was washed with water, dried, and then mixed with lithium carbonate. The obtained mixture was calcined at about 900° C. for about 10 hours. The resultant product was pulverized, to thereby obtain a positive electrode active material.

A compositional ratio of the obtained positive electrode active material was $Li_{1.08}Mn_{1.93}Mg_{0.01}O_4$.

2. Properties of Positive Electrode Active Material (1) Concentration of Various Elements on Surface of and Inside Lithium-transition Metal Composite Oxide The positive electrode active materials obtained in Examples 3-5 and 3-6 were sputtered with an Ar beam for predetermined periods of time, to thereby respectively measure concentration of boron, magnesium, and titanium. A region at a depth of 0 μm or more and 0.1 μm or less from the surface of the lithium-transition metal composite oxide particles (sputtering time of 1 minute or less) was defined as "surface of lithium-transition metal composite oxide particles". A region at a depth of greater than 0.1 μm from the surface of the lithium-transition metal composite oxide particles (sputtering time of 1 to 20 minutes) was defined as "inside lithium-transition metal composite oxide particles". The concentration of each element existing on the surface of the lithium-transition metal composite oxide particles was calculated as an average value of concentration at sputtering time of 0 and 1 minute. The concentration of each element existing inside the lithium-transition metal composite oxide particles was calculated as an average value of concentration at sputtering time of 5, 10, and 20 minutes.

Table 1 shows the results.

The concentration of each of boron, magnesium, and zirconium was similarly measured for the positive electrode active material obtained in Example 1-1. The concentration of any element on the surface of the lithium-transition metal composite oxide particles was higher than the concentration thereof inside the particles.

The concentration of each of boron, magnesium, and cerium was similarly measured for the positive electrode active material obtained in Example 1-2. The concentration of any element on the surface of the lithium-transition metal composite oxide particles was higher than the concentration thereof inside the particles.

The concentration of each of boron and magnesium was similarly measured for the positive electrode active materials obtained in Examples 3-1, 3-2, and 3-3. The concentration of any element on the surface of the lithium-transition metal composite oxide particles was higher than the concentration thereof inside the particles.

The concentration of each of boron and magnesium was similarly measured for the positive electrode active material obtained in Example 2-1. The concentration of any element on the surface of the lithium-transition metal composite oxide particles was higher than the concentration thereof inside the particles.

Further, the concentration of fluorine was measured through the following method for the positive electrode active material obtained in Example 2-1.

2 g of the positive electrode active material obtained in Example 2-1 was dissolved in acid, and a fluorine content in a filtrate was measured using an ion meter. The fluorine content was 2,000 ppm at this time. Then, 150 mL of water was added to 2 g of the positive electrode active material obtained in Example 2-1 and the whole was mixed for 30 minutes to dissolve fluorine existing on the particle surface, to thereby determine the fluorine content in the obtained filtrate. The fluorine content was 1,700 ppm at this time. Further, 2 g of the positive electrode active material obtained in Example 2-1 was washed with water and then dissolved in acid, to thereby measure the fluorine content in the filtrate using an ion meter. The fluorine content was 300 ppm at this time.

The result confirmed that the fluorine concentration on the surface of the lithium-transition metal composite oxide particles was higher than the fluorine concentration inside the particles.

(2) Specific Surface Area, Equivalent Specific Surface Diameter, and Particle Size Distribution of Positive Electrode Active Material Specific surface areas of the positive electrode active materials obtained in Examples 2-1 and 3-2, and Comparative Examples 1 to 3 were measured through a constant-pressure BET adsorption method using nitrogen gas.

Further, equivalent specific surface diameters of the positive electrode active materials obtained in Examples 2-1 and 3-2, and Comparative Examples 1 to 3 were measured through an air permeability method using Fisher Sub-Sieve Sizer (F.S.S.S.).

Further, particle size distributions of the positive electrode active materials obtained in Examples 2-1 and 3-2, and Comparative Examples 1 to 3 were measured through laser diffraction scattering, to thereby determine D10, D50, and D90.

Table 2 shows the calculated results of D50, D10/D50, and D90/D50.

(3) Mn Elution Test for Positive Electrode Active Material

The positive electrode active materials obtained in Examples 2-1, 3-1, 3-3, 3-5, and 3-6, and Comparative Examples 1 to 3 were dried at 110° C. for 15 hours. Each of the dried positive electrode active materials was mixed with a 1 mol/L solution prepared by dissolving $LiPF_6$ in a mixed solvent of ethylene carbonate/diethyl carbonate=3/7, and the mixture was stored at 85° C. for 48 hours. The resultant mixture was filtered to remove the positive electrode active material, and then an amount of Mn eluted into a filtrate (weight of Mn element with respect to weight of electrolytic solution) was measured through an ICP spectroscopy. A smaller amount of Mn elution suppresses gas generation during high-temperature storage more.

Tables 2 and 3 show the results.

(4) Polar Plate Density of Positive Electrode Active Material 95 parts by weight of positive electrode active material powder obtained in Examples 2-1 and 3-2, and Comparative Examples 1 to 3 were respectively kneaded with an N-methyl pyrrolidone solution containing polyvinylidene fluoride (5 parts by weight as polyvinylidene fluoride) to prepare pastes. The pastes were applied to aluminum plates through a doctor blade method and dried, to thereby provide positive electrode plates. The positive electrode plates were cut into a predetermined size (5 $cm^2$), and the plates were pressed using a uniaxial pressing machine at pressures of 200 MPa and 360 MPa. Polar plate densities before (pressure of 0 MPa) and after (pressures of 200 MPa and 360 MPa) pressing were calculated from thicknesses and weights of the plates.

Figure 1:
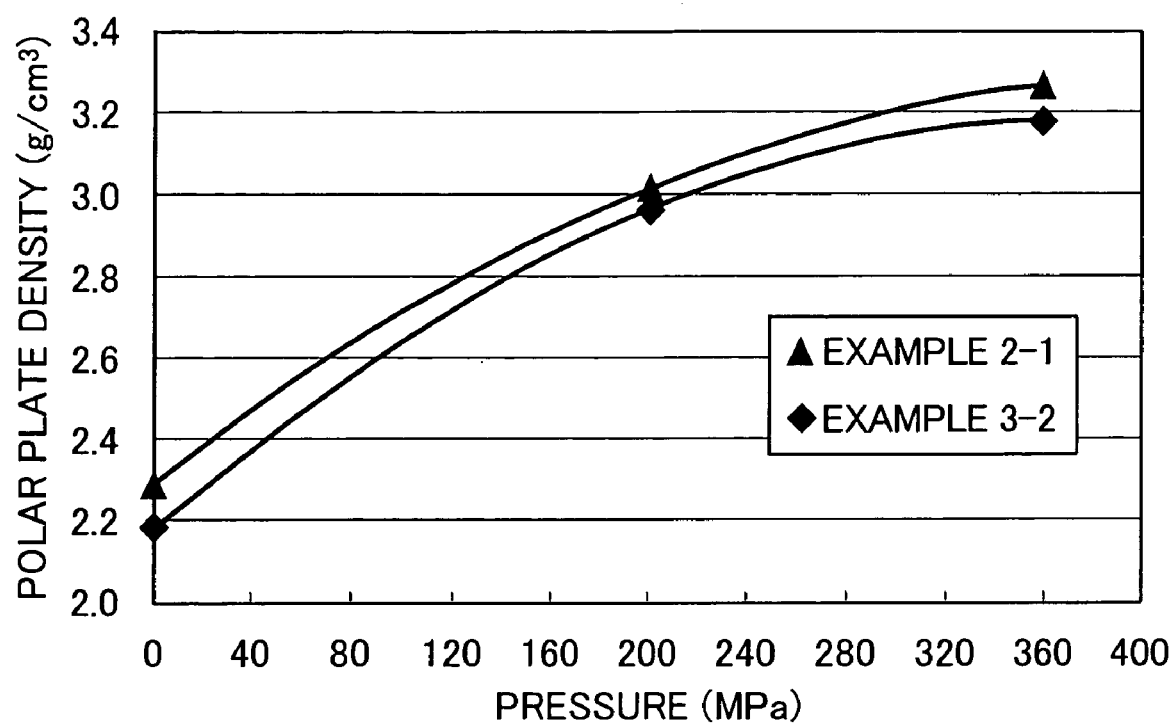
FIG. 1 is a graph representing the results of pressing the positive electrode plates employing the positive electrode active materials obtained in Examples 2-1 and 3-2 at pressures of 0 MPa, 200 MPa, and 360 MPa.

Table 2 shows the results of pressing the positive electrode plates at a pressure of 360 MPa, and FIG. 1 shows the results of pressing the positive electrode plates employing the positive electrode active materials obtained in Examples 2-1 and 3-2 at pressures of 0 MPa, 200 MPa, and 360 MPa.

(5) Lattice Constant of Positive Electrode Active Material

Lattice constants of the positive electrode active materials obtained in Examples 3-3, 3-4, 3-5, and 3-6, and Comparative Examples 1 to 3 were calculated by measuring the intensities of X-ray diffraction patterns in the range of 15 to 70° with an X-ray diffraction device (Ultima, manufactured by Rigaku Industrial Corporation) using $CuK\alpha 1$ as an X-ray source under the conditions of a tube current of 200 mA and a tube voltage of 40 kV.

Table,3 shows the results.

(6) (400) Crystallinity of Positive Electrode Active Material

The X-ray diffraction analysis was conducted for the positive electrode active materials obtained in Examples 1-1, 1-2, 3-1, 3-3, 3-5, and 3-6, and Comparative Examples 1 to 3. The X-ray diffraction analysis was performed on an X-ray diffraction device (Ultima 2500V, manufactured by Rigaku Industrial Corporation) using $CuK\alpha 1$ as an X-ray source under the conditions of a tube current of 100 mA and a tube voltage of 40 kV. (400) crystallinities of the positive electrode active materials were determined based on the X-ray diffraction patterns obtained through the X-ray diffraction analysis and using the Scherrer equation represented by the above equation (1).

Table 3 shows the results of Examples 3-3, 3-5, and 3-6, and Comparative Examples 1 to 3.

Further, the (400) crystallinities of the positive electrode active materials obtained in Examples 1-1, 1-2, and 3-1 were respectively 940 Å, 803 Å, and 821 Å.

As is clear from Table 1, it is found that the positive electrode active materials of the present invention (Examples 3-5 and 3-6) respectively had higher concentration of boron existing on the particle surface than concentration of boron existing inside the particles.

Further, it is found that the positive electrode active materials of Examples 3-5 and 3-6 had higher concentration of magnesium existing on the particle surface than concentration of magnesium existing inside the particles.

Further, it is found that the positive electrode active material of Example 3-6 had higher concentration of titanium existing inside the particle than the concentration of boron existing inside the particles.

Further, it is found that the positive electrode active materials of Examples 3-5 and 3-6 had higher concentration of magnesium existing inside the particles than the concentration of boron existing inside the particles.

Table 2 shows that the positive electrode active materials of the present invention (Examples 2-1 and 3-2) were respectively capable of suppressing amounts of Mn elution and were excellent in suppressing gas generation during high-temperature storage.

Further, as is clear from Table 2 and FIG. 1, it is found that the positive electrode active materials of the present invention (Examples 2-1 and 3-2) had high polar plate densities.

As is clear from Table 3, it is found that the positive electrode active materials of the present invention (Examples 3-3, 3-4, 3-5, and 3-6) respectively had low amounts of Mn elution and were excellent in suppressing gas generation during high-temperature storage.

TABLE 1

| | | B (Atomic %) | Mg (Atomic %) | Ti (Atomic %) |
| --- | --- | --- | --- | --- |
| Example 3-5 | Inside | 0.0 | 0.6 | 0.0 |
| | Surface | 4.0 | 1.4 | 0.0 |
| Example 3-6 | Inside | 0.1 | 0.4 | 2.6 |
| | Surface | 4.8 | 1.2 | 2.8 |

TABLE 2

| | D10/D50 | D90/D50 | D50 (μm) | Specific surface area ($m^2$/g) | Equivalent specific surface diameter (μm) | Amount of Mn elution (ppm) | Polar plate density (g/$cm^3$) |
| --- | --- | --- | --- | --- | --- | --- | --- |
| Example 2-1 | 0.167 | 2.81 | 7.8 | 0.80 | 3.8 | 67 | 3.26 |
| Example 3-2 | 0.122 | 2.24 | 11.5 | 1.20 | 2.8 | 92 | 3.18 |
| Comparative Example 1 | 0.129 | 3.44 | 5.8 | 2.61 | 1.4 | 274 | 2.70 |
| Comparative Example 2 | 0.129 | 3.59 | 5.4 | 2.48 | 1.4 | 109 | 2.75 |
| Comparative Example 3 | 0.282 | 1.76 | 16.9 | 0.69 | 5.0 | — | 3.05 |

TABLE 3

| | Lattice constant (Å) | (400) crystallinity (Å) | Amount of Mn elution (ppm) |
| --- | --- | --- | --- |
| Example 3-3 | 8.231 | 811 | 95 |
| Example 3-4 | 8.226 | — | — |
| Example 3-5 | 8.234 | 770 | 90 |
| Example 3-6 | 8.244 | 733 | 80 |
| Comparative Example 1 | 8.229 | 595 | 274 |
| Comparative Example 2 | 8.230 | 646 | 109 |
| Comparative Example 3 | 8.227 | 790 | — |

3. Evaluation of Positive Electrode Active Material

Test secondary batteries with lithium metal as negative electrodes and cylindrical batteries were fabricated using the obtained respective positive electrode active materials, and the batteries were evaluated as follows.

A. Evaluation Using Test Secondary Battery with Lithium Metal as Negative Electrode Test secondary batteries with lithium metal as negative electrodes were fabricated as follows.

90 parts by weight of the positive electrode active material powder obtained in any of Examples 3-3, 3-4, 3-5, and 3-6, and Comparative Examples 1 to 3, 5 parts by weight of carbon powder as a conductive agent, and an N-methyl pyrrolidone solution containing polyvinylidene fluoride (5 parts by weight as polyvinylidene fluoride) were kneaded together to prepare a paste. The paste was applied to a positive electrode current collector and dried, to thereby provide a positive electrode plate. A test secondary battery with lithium metal as a negative electrode was fabricated using the obtained positive electrode plate.

(1) Initial Discharge Capacity

The test secondary battery with lithium metal as a negative electrode was discharged at 25° C. under the conditions of a charging potential of 4.3 V, a discharging potential of 2.85 V, and a discharging load of 0.2 C (note that 1C hereinafter represents a current load at which discharge is completed in 1 hour). The discharge capacity at this time was defined as an initial discharge capacity.

B. Evaluation Using Cylindrical Battery

Cylindrical batteries were fabricated as follows.

The positive electrode plates were obtained using the positive electrode active materials obtained in Examples 1-1, 1-2, 3-1, 3-3, and 3-5, and Comparative Examples 1 to 3 in the same manner as for the test secondary batteries with lithium metal as negative electrodes. Further, a carbon material was used as a negative electrode active material and was applied to a negative electrode current collector and dried in the same manner as for the positive electrode plate, to thereby obtain a negative electrode plate. A porous propylene film was used as a separator. A 1 mol/L solution prepared by dissolving $LiPF_6$ in a mixed solvent of ethylene carbonate/methylethyl carbonate=3/7 (volume ratio) was used as an electrolytic solution. The positive electrode plate, the negative electrode plate, and the separator were formed into thin sheets, which were wound and accommodated into a metal cylindrical battery case. The electrolytic solution was injected into the battery case, to thereby obtain a cylindrical battery of a lithium ion secondary battery.

(1) Discharge Capacity Maintenance Ratio

The discharge capacities were measured after 100 cycles and 200 cycles of repeated charging and discharging at 25° C. under the conditions of a charging potential of 4.2 V, a discharging potential of 2.75 V, and a discharging load of 2 C. Discharge capacity maintenance ratios were determined by dividing the values of the obtained discharge capacities after 100 cycles and 200 cycles by the value of the discharge capacity after 1 cycle, to thereby evaluate the cycle characteristics.

(2) High-temperature Discharge Capacity Maintenance Ratio

The discharge capacities were measured after 100 cycles, 200 cycles and 500 cycles of repeated charging and discharging at 60° C. under the conditions of a charging potential of 4.2 V, a discharging potential of 2.75 V, and a discharging load of 2 C. High-temperature discharge capacity maintenance ratios were determined by dividing the values of the obtained discharge capacity after 100 cycles, 200 cycles and 500 cycles by the value of the discharge capacity after 1 cycle, to thereby evaluate the high-temperature cycle characteristics.

(3) High Rate Capacity Maintenance Ratio

The initial discharge capacity was measured at 25° C. under the conditions of a charging potential of 4.2 V, a discharging potential of 3.0 V, and a discharging load of 0.2 C. Then, the high rate discharge capacity was measured at 25° C. under the conditions of a charging potential of 4.2 V, a discharging potential of 3.0 V, and a discharging load of 3.0 C. The high rate capacity maintenance ratio was determined by dividing the value of the obtained high rate discharge capacity by the value of the initial discharge capacity, to thereby evaluate the high rate characteristics.

(4) Initial Average Potential, Average Potentials After 100 Cycles and 200 Cycles, and Average Potential Maintenance Ratios The initial discharge capacity and electric power were measured at 25° C. under the conditions of a charging potential of 4.2 V, a discharging potential of 2.75 V, and a discharging load of 2.0 C. An initial average potential was determined by dividing the value of the obtained electric power by the initial discharge capacity.

Next, the discharge capacity and electric power after 100 cycles and 200 cycles were measured at 25° C. under the conditions of a charging potential of 4.2 V, a discharging potential of 2.75 V, and a discharging load of 2.0 C. Average potentials after 100 cycles and 200 cycles were determined by dividing the values of the obtained electric power by the initial discharge capacity.

Average potential maintenance ratios were determined by dividing the values of the obtained average potentials after 100 cycles and 200 cycles by the initial average potential.

(5) Initial High-temperature Average Potential, High-temperature Average Potentials After 100 Cycles and 200 Cycles, and High-temperature Average Potential Maintenance Ratios The initial discharge capacity and electric power were measured at 60° C. under the conditions of a charging potential of 4.2 V, a discharging potential of 2.75 V, and a discharging load of 2.0 C. An initial high-temperature average potential was determined by dividing the value of the obtained electric power by the initial discharge capacity.

Next, the discharge capacity and electric power after 100 cycles and 200 cycles were measured at 60° C. under the conditions of a charging potential of 4.2 V, a discharging potential of 2.75 V, and a discharging load of 2.0 C. High-temperature average potentials after 100 cycles and 200 cycles were determined by dividing the values of the obtained electric power by the initial discharge capacity.

High-temperature average potential maintenance ratios were determined by dividing the values of the obtained the high-temperature average potentials after 100 cycles and 200 cycles by the initial high-temperature average potential.

Tables 4 and 5 show the results. Note that, "-" in Table 5 indicates that no measurement was performed.

As is clear from Tables 4 and 5, it is found that the positive electrode active materials of the present invention had excellent cycle characteristics, high-temperature cycle characteristics, and high rate characteristics. Further, it is found that the positive electrode active materials of the present invention had high initial average potential, average potentials after 100 cycles and 200 cycles, initial high-temperature average potential, and high-temperature average potentials after 100 cycles and 200 cycles. As understood from the above, the positive electrode active materials of the present invention had improved average potential maintenance ratios and high-temperature average potential maintenance ratios.

TABLE 4

|  | Initial discharge capacity (mAh/g) |
| --- | --- |
| Example 3-3 | 114 |
| Example 3-4 | 104 |
| Example 3-5 | 115 |
| Example 3-6 | 113 |
| Comparative Example 1 | 112 |
| Comparative Example 2 | 115 |
| Comparative Example 3 | 114 |

TABLE 5

|  | Discharge capacity maintenance ratio after 100 cycles (%) | Discharge capacity maintenance ratio after 200 cycles (%) | High-temperature discharge capacity maintenance ratio after 100 cycles (%) | High-temperature discharge capacity maintenance ratio after 200 cycles (%) | High-temperature discharge capacity maintenance ratio after 500 cycles (%) | High rate capacity maintenance ratio (%) |
|---|---|---|---|---|---|---|
| Example 1-1 | 90.0 | — | 70.8 | 58.7 | — | 97.2 |
| Example 1-2 | 90.0 | — | 72.1 | 59.6 | — | 96.7 |
| Example 3-1 | 89.6 | — | 63.8 | 51.3 | — | 95.6 |
| Example 3-3 | 90.7 | 85.4 | 64.8 | 53.7 | 31.4 | 95.7 |
| Example 3-5 | 91.4 | 86.1 | 63.4 | 53.1 | 33.4 | 96.6 |
| Comparative Example 3 | 91.6 | 84.6 | 60.3 | 37.7 | — | 94.1 |

|  | Initial average potential (V) | Average potential after 100 cycles (V) | Average potential maintenance ratio after 100 cycles (%) | Average potential after 200 cycles (V) | Average potential maintenance ratio after 200 cycles (%) |
|---|---|---|---|---|---|
| Example 1-1 | 3.729 | 3.702 | 99.3 | — | — |
| Example 1-2 | 3.727 | 3.700 | 99.3 | — | — |
| Example 3-1 | 3.707 | 3.688 | 99.5 | — | — |
| Example 3-3 | 3.717 | 3.695 | 99.4 | 3.685 | 99.1 |
| Example 3-5 | 3.730 | 3.721 | 99.8 | 3.707 | 99.4 |
| Comparative Example 3 | 3.734 | 3.678 | 98.5 | 3.658 | 97.9 |

|  | Initial high-temperature average potential (V) | High-temperature average potential after 100 cycles (V) | High-temperature average potential maintenance ratio after 100 cycles (%) | High-temperature average potential after 200 cycles (V) | High-temperature average potential maintenance ratio after 200 cycles (%) |
|---|---|---|---|---|---|
| Example 1-1 | 3.761 | 3.694 | 98.2 | 3.680 | 97.8 |
| Example 1-2 | 3.764 | 3.711 | 98.6 | 3.690 | 98.0 |
| Example 3-1 | 3.733 | 3.629 | 97.2 | 3.599 | 96.4 |
| Example 3-3 | 3.741 | 3.675 | 98.2 | 3.651 | 97.6 |
| Example 3-5 | 3.768 | 3.710 | 98.5 | 3.691 | 98.0 |
| Comparative Example 3 | 3.690 | 3.584 | 97.1 | 3.443 | 93.3 |

What is claimed is:

1. A positive electrode active material for a nonaqueous electrolyte secondary battery containing at least a lithium-transition metal composite oxide of a spinel structure, in which the lithium-transition metal composite oxide is represented by the general formula $Li_{1+a}Mg_bMn_{2-a-b}B_cF_dO_{4+e}$, (where, $-0.2 \leq a \leq 0.2$, $0.005 \leq b \leq 0.10$, $0.002 \leq c \leq 0.02$, $0.0025 \leq d \leq 0.01$ and $-0.5 \leq e \leq 0.5$).

2. The positive electrode active material for a nonaqueous electrolyte secondary battery according to claim 1,
wherein fluorine exists on at least a surface of the lithium-transition metal composite oxide, and
a concentration of the fluorine on the surface of the lithium-transition metal composite oxide is higher than a concentration of the fluorine inside the lithium-transition metal composite oxide.

3. The positive electrode active material for a nonaqueous electrolyte secondary battery according to claim 2,
wherein magnesium exists on at least the surface of the lithium-transition metal composite oxide, and
a concentration of the magnesium on the surface of the lithium-transition metal composite oxide is higher than a concentration of the magnesium inside the lithium-transition metal composite oxide.

4. The positive electrode active material for a nonaqueous electrolyte secondary battery according to claim 3,
wherein the concentration of the magnesium inside the lithium-transition metal composite oxide is higher than the concentration of the fluorine inside the lithium-transition metal composite oxide.

5. The positive electrode active material for a nonaqueous electrolyte secondary battery according to claim 2,
wherein boron exists on at least the surface of the lithium-transition metal composite oxide, and
a concentration of the boron on the surface of the lithium-transition metal composite oxide is higher than a concentration of the boron inside the lithium-transition metal composite oxide.

6. A positive electrode active material for a nonaqueous electrolyte secondary battery comprising:
a lithium-transition metal composite oxide of a spinel structure, wherein the lithium-transition metal composite oxide is represented by the general formula $Li_{1+a}Mg_bTi_cMn_{2-a-b-c}B_dO_{4+e}$, (where, $-0.2 \leq a \leq 0.2$, $0.005 \leq b \leq 0.10$, $0.005 \leq c \leq 0.05$, $0.002 \leq d \leq 0.02$ and $-0.5 \leq e \leq 0.5$).

7. The positive electrode active material for a nonaqueous electrolyte secondary battery according to claim 6,
   wherein boron and magnesium exist on at least a surface of the lithium-transition metal composite oxide,
   a concentration of the boron on the surface of the lithium-transition metal composite oxide is higher than a concentration of the boron inside the lithium-transition metal composite oxide, and
   a concentration of the magnesium on the surface of the lithium-transition metal composite oxide is higher than a concentration of the magnesium inside the lithium-transition metal composite oxide.

8. The positive electrode active material for a nonaqueous electrolyte secondary battery according to claim 7,
   wherein the concentration of the magnesium inside the lithium-transition metal composite oxide is higher than the concentration of the boron inside the lithium-transition metal composite oxide.

9. The positive electrode active material for a nonaqueous electrolyte secondary battery according to claim 7,
   wherein the concentration of the titanium inside the lithium-transition metal composite oxide is higher than the concentration of the boron inside the lithium-transition metal composite oxide.

10. A nonaqueous electrolyte secondary battery, comprising:
    a strip positive electrode constituted by forming, on at least one side of a strip positive electrode current collector, a positive electrode active material layer employing the positive electrode active material for a nonaqueous electrolyte secondary battery according to claim 1;
    a strip negative electrode constituted by forming, on at least one side of a strip negative electrode current collector, a negative electrode active material layer employing, as a negative electrode active material, a lithium metal, a lithium alloy, a carbon material capable of intercalating and deintercalating lithium ions or a compound capable of intercalating and deintercalating the lithium ions; and
    a strip separator,
    wherein the strip positive electrode and the strip negative electrode laminated with the strip separator between the strip positive electrode and the strip negative electrode are wound a plurality of times to form a winding of the strip positive electrode and the strip negative electrode with the strip separator intervening between the strip positive electrode and the strip negative electrode.

11. A nonaqueous electrolyte secondary battery, comprising:
    a strip positive electrode constituted by forming, on at least one side of a strip positive electrode current collector, a positive electrode active material layer employing the positive electrode active material for a nonaqueous electrolyte secondary battery according to claim 6;
    a strip negative electrode constituted by forming, on at least one side of a strip negative electrode current collector, a negative electrode active material layer employing, as a negative electrode active material, a lithium metal, a lithium alloy, a carbon material capable of intercalating and deintercalating lithium ions or a compound capable of intercalating and deintercalating the lithium ions; and
    a strip separator,
    wherein the strip positive electrode and the strip negative electrode laminated with the strip separator between the strip positive electrode and the strip negative electrode are wound a plurality of times to form a winding of the strip positive electrode and the strip negative electrode with the strip separator intervening between the strip positive electrode and the strip negative electrode.

* * * * *